US012049122B2

(12) United States Patent
Miura et al.

(10) Patent No.: US 12,049,122 B2
(45) Date of Patent: Jul. 30, 2024

(54) REFRIGERATION CYCLE DEVICE

(71) Applicant: DENSO CORPORATION, Kariya (JP)

(72) Inventors: Koji Miura, Kariya (JP); Hiroaki Kawano, Kariya (JP); Motohiro Yamaguchi, Kariya (JP); Kazuya Taniguchi, Kariya (JP); Yoshiki Kato, Kariya (JP); Masamichi Makihara, Kariya (JP); Takahiro Maeda, Kariya (JP); Kuniyoshi Tanioka, Kariya (JP); Toru Okamura, Kariya (JP); Naoya Makimoto, Kariya (JP)

(73) Assignee: DENSO CORPORATION, Kariya (JP)

( * ) Notice: Subject to any disclaimer, the term of this patent is extended or adjusted under 35 U.S.C. 154(b) by 371 days.

(21) Appl. No.: 17/484,538

(22) Filed: Sep. 24, 2021

(65) Prior Publication Data

US 2022/0009309 A1    Jan. 13, 2022

Related U.S. Application Data

(63) Continuation of application No. PCT/JP2020/010924, filed on Mar. 12, 2020.

(30) Foreign Application Priority Data

Mar. 29, 2019   (JP) ................................. 2019-067629

(51) Int. Cl.
  *B60H 1/00*   (2006.01)
  *B60H 1/32*   (2006.01)
  (Continued)

(52) U.S. Cl.
  CPC ..... *B60H 1/00899* (2013.01); *B60H 1/32284* (2019.05); *F25B 1/00* (2013.01);
  (Continued)

(58) Field of Classification Search
  CPC ............ B60H 1/00899; B60H 1/32284; B60H 1/00278; B60H 2001/00928; B60H 2001/00942; F25B 1/00; F25B 5/02
  See application file for complete search history.

(56) References Cited

U.S. PATENT DOCUMENTS 9,994,087 B2 *   6/2018   Enomoto ................. B60H 1/22
10,183,548 B2 *   1/2019   Enomoto ........... B60H 1/00485
(Continued)

FOREIGN PATENT DOCUMENTS

JP       S477951 Y1      3/1972
JP       H09196479 A     7/1997
(Continued)

*Primary Examiner* — Ljiljana V. Ciric
(74) *Attorney, Agent, or Firm* — Harness, Dickey & Pierce, P.L.C.

(57) ABSTRACT

A refrigeration cycle device includes a heat pump cycle, a high-temperature heat medium circuit, and a low-temperature heat medium circuit. The low-temperature heat medium circuit includes a plurality of heat absorption devices configured to have a heat absorption amount to be absorbed by the low-temperature heat medium flowing out of a low-temperature heat medium-refrigerant heat exchanger, and a heat absorption adjusting unit configured to change the heat absorption amount of the low-temperature heat medium in the respective heat absorption devices. In the refrigeration cycle device, a flow amount of the refrigerant flowing into the low-temperature heat medium-refrigerant heat exchanger is reduced when the heat absorption adjusting unit changes the heat absorption amount of the low-temperature heat medium in the respective heat absorption devices, and the flow amount of the refrigerant flowing into the low-temperature heat medium-refrigerant heat exchanger is increased when a recovery condition is satisfied.

15 Claims, 11 Drawing Sheets

(51) Int. Cl.
  *F25B 1/00* (2006.01)
  *F25B 5/02* (2006.01)
(52) U.S. Cl.
  CPC ............ *F25B 5/02* (2013.01); *B60H 1/00278* (2013.01); *B60H 2001/00928* (2013.01); *B60H 2001/00942* (2013.01)

(56) References Cited

U.S. PATENT DOCUMENTS

| | | | |
|---|---|---|---|
| 10,369,866 B2 * | 8/2019 | Yamanaka | B60H 1/00278 |
| 10,400,662 B2 * | 9/2019 | Enomoto | F01P 3/20 |
| 10,449,830 B2 * | 10/2019 | Sugimura | B60H 1/3213 |
| 10,562,371 B2 * | 2/2020 | Sugimura | B60H 1/12 |
| 10,562,376 B2 * | 2/2020 | Miura | B60H 1/00899 |
| 10,717,341 B2 * | 7/2020 | Sugimura | F01P 7/16 |
| 10,723,203 B2 * | 7/2020 | Kato | F25B 5/04 |
| 10,837,348 B2 * | 11/2020 | Enomoto | B60H 1/004 |
| 10,899,195 B2 * | 1/2021 | Miura | B60H 1/00557 |
| 11,180,000 B2 * | 11/2021 | Aikawa | B60H 1/00899 |
| 11,299,014 B2 * | 4/2022 | Kato | B60H 1/32284 |
| 2017/0021698 A1 | 1/2017 | Hatakeyama et al. | |
| 2020/0164719 A1 * | 5/2020 | Shiratori | B60H 1/00485 |
| 2020/0198443 A1 | 6/2020 | Kato et al. | |
| 2022/0009309 A1 * | 1/2022 | Miura | B60H 1/32284 |
| 2022/0011006 A1 * | 1/2022 | Miura | B60H 1/143 |
| 2022/0088996 A1 * | 3/2022 | Okamura | B60H 1/00921 |
| 2023/0382195 A1 * | 11/2023 | Yamada | B60H 1/143 |

FOREIGN PATENT DOCUMENTS

| | | | |
|---|---|---|---|
| JP | 2002195668 A | 7/2002 | |
| JP | 2015186989 A | 10/2015 | |
| JP | JP-WO2017038677 A1 * | 1/2018 | |
| JP | JP-WO2018229826 A1 * | 12/2019 | |
| JP | WO2019073621 A1 * | 4/2020 | |
| WO | WO-2011015426 A1 | 2/2011 | |
| WO | WO2017038677 A1 * | 3/2017 | |
| WO | WO-2017145638 A1 * | 8/2017 | ............... B60H 1/00 |
| WO | WO-2019058838 A1 | 3/2019 | |
| WO | JP-WO2019073621 A1 * | 4/2019 | ............. F25B 13/00 |
| WO | WO2019073621 A1 * | 4/2019 | |
| WO | WO-2020203150 A1 * | 10/2020 | ......... B60H 1/00899 |
| WO | WO-2021009881 A1 * | 1/2021 | ................ F25B 1/00 |
| WO | WO-2022158153 A1 * | 7/2022 | ......... B60H 1/00278 |

* cited by examiner

REFRIGERATION CYCLE DEVICE

CROSS REFERENCE TO RELATED APPLICATION

The present application is a continuation application of International Patent Application No. PCT/JP2020/010924 filed on Mar. 12, 2020, which designated the U.S. and claims the benefit of priority from Japanese Patent Application No. 2019-067629 filed on Mar. 29, 2019. The entire disclosures of all of the above applications are incorporated herein by reference.

TECHNICAL FIELD

The present disclosure relates to a refrigeration cycle device.

BACKGROUND

A vehicle air conditioner may be capable of cooling a secondary battery with low-temperature cooling water generated by an evaporator in a refrigerant cycle. The vehicle air conditioner includes the refrigerant cycle, a low-temperature water circuit and a high-temperature water circuit, and is configured to be capable of cooling and heating a vehicle interior. The low-temperature water circuit includes a cooling water flow passage of a secondary battery, a low-temperature radiator that exchanges heat between the cooling water and outside air, and a refrigerant-water heat exchanger that exchanges heat between a refrigerant of the refrigeration cycle and the cooling water. In the vehicle air conditioner, a temperature of the cooling water circulating in the low-temperature water circuit may be easily and greatly changed due to devices such as the secondary battery, the low-temperature radiator and the refrigerant-water heat exchanger, and thereby the durability of a compressor of the refrigerant cycle may be affected.

SUMMARY

The present disclosure provides a refrigeration cycle device with a high durability.

According to an aspect of the present disclosure, a refrigeration cycle device includes a heat pump cycle, a high-temperature heat medium circuit and a low-temperature heat medium circuit. When a heat absorption adjusting unit changes a heat absorption amount of a low-temperature heat medium in the low-temperature heat medium circuit, the temperature of the low-temperature heat medium flowing into a low-temperature heat medium-refrigerant heat exchanger changes. In such a case, because a flow amount of the refrigerant flowing into a low-temperature heat medium-refrigerant heat exchanger is reduced, an influence on the durability of a compressor of the heat pump cycle can be effectively reduced. As a result, the durability of the compressor can be improved.

BRIEF DESCRIPTION OF THE DRAWINGS

The above and other objects, features and advantages of the present disclosure will become more apparent from the following detailed description made with reference to the accompanying drawings. In the drawings.

DESCRIPTION OF EMBODIMENTS

Figure 1:
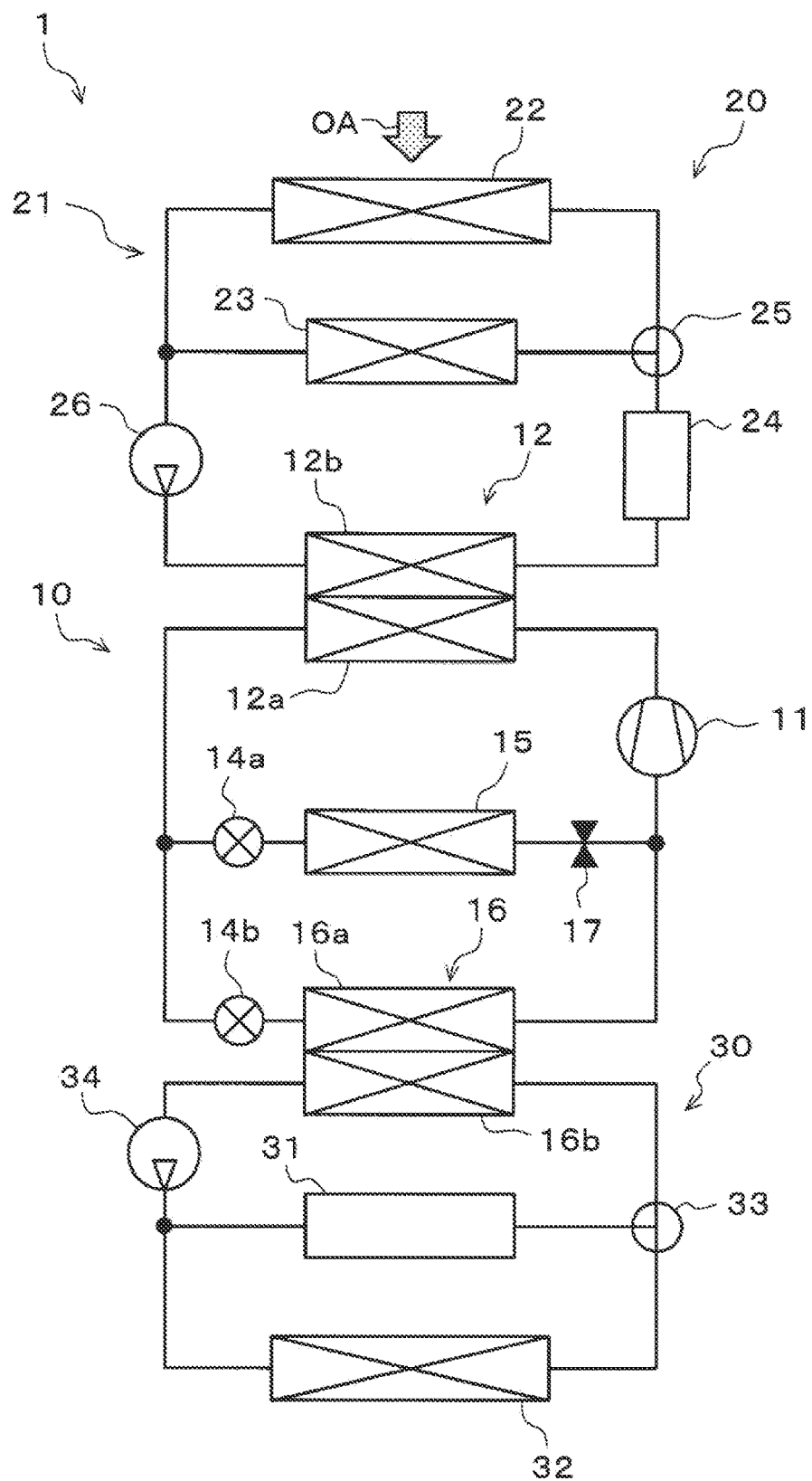
FIG. 1 is an overall configuration diagram of an air conditioner according to a first embodiment.

In a vehicle air conditioner including a heat pump cycle, a high-temperature water circuit and a low-temperature water circuit, waste heat absorbed while cooling a secondary battery in the low-temperature water circuit and heat absorbed from outside air in the low temperature radiator are pumped up by the heat pump cycle, and is used for heating a vehicle interior as an air-conditioned space, through a heater core of the high-temperature water circuit. In the low-temperature water circuit, the secondary battery and the low temperature radiator are arranged as heat absorption devices. The vehicle air conditioner may be configured to change a flow ratio between a flow amount of the cooling water flowing into a cooling water flow passage of the secondary battery and a flow amount of the cooling water flowing into the low temperature radiator in the low-temperature water circuit.

However, in the vehicle air conditioner in which a plurality of heat absorption devices are arranged in the low-temperature water circuit, when a flow ratio of the cooling water flowing into the plurality of heat absorption devices is changed, the temperature of the cooling water flowing into the refrigerant-water heat exchanger may change suddenly.

For example, when the flow amount of the cooling water flowing into the cooling water flow passage of the secondary battery is rapidly increased, the temperature of the cooling water flowing into the refrigerant-water heat exchanger rises sharply. As a result, the high-pressure refrigerant pressure on the discharge side of a compressor of the heat pump cycle rises sharply, and the discharge temperature of the refrigerant of the compressor rises sharply. As a result, the durability of the compressor of the heat pump cycle may be affected.

Further, for example, when the flow amount of the cooling water flowing into the low temperature radiator is rapidly increased, the temperature of the cooling water flowing into the refrigerant-water heat exchanger drops sharply. In this case, the refrigerant may be condensed in the refrigerant-water heat exchanger, and a liquid back may be generated such that the liquid phase refrigerant flows into the compressor. As a result, the durability of the compressor may be affected.

In view of the foregoing matter, it is an object of the present disclosure to provide a refrigeration cycle device with a high durability.

According to an aspect of the present disclosure, a refrigeration cycle device includes a heat pump cycle, a high-temperature heat medium circuit and a low-temperature heat medium circuit. The heat pump cycle is provided with a compressor configured to compress and discharge a refrigerant, a high-temperature heat medium-refrigerant heat exchanger configured to exchange heat between the refrigerant discharged from the compressor and a high-temperature heat medium, and a heat-absorbing decompression unit configured to decompress the refrigerant flowing out of the high-temperature heat medium-refrigerant heat exchanger, and a low-temperature heat medium-refrigerant heat exchanger configured to exchange heat between a low-pressure refrigerant decompressed by the heat-absorbing decompression unit and a low-temperature heat medium.

The high-temperature heat medium circuit includes a heating heat exchanger configured to heat a fluid to be temperature-adjusted by exchanging heat between the high-temperature heat medium flowing out of the high-temperature heat medium-refrigerant heat exchanger and the fluid. The low-temperature heat medium circuit includes a plurality of heat absorption devices configured respectively to have a heat absorption amount to be absorbed by the low-temperature heat medium flowing out of the low-temperature heat medium-refrigerant heat exchanger, and a heat absorption adjusting unit configured to change the heat absorption amount of the low-temperature heat medium in the respective heat absorption devices.

In the refrigeration cycle device, a flow amount of the refrigerant flowing into the low-temperature heat medium-refrigerant heat exchanger is reduced when the heat absorption adjusting unit changes the heat absorption amount of the low-temperature heat medium in the respective heat absorption devices.

According to this, when the heat absorption adjusting unit changes the heat absorption amount of the low-temperature heat medium in the low-temperature heat medium circuit, the temperature of the low-temperature heat medium flowing into the low-temperature heat medium-refrigerant heat exchanger changes. In such a case, since the flow amount of the refrigerant flowing into the low-temperature heat medium-refrigerant heat exchanger is reduced, the influence on the durability of the compressor can be effectively reduced. As a result, the durability of the compressor can be improved.

Hereinafter, embodiments for implementing the present disclosure will be described referring to drawings. In each embodiment, portions corresponding to those described in the preceding embodiment are denoted by the same reference numerals, and overlapping descriptions may be omitted. In a case where only a part of a configuration is described in each embodiment, the other embodiments described above are capable of being applied for the other parts of the configuration. Not only a combination of parts that clearly indicate that the combination is possible in each embodiment, but also a partial combination of embodiments even if the combination is not specified is also possible when there is no problem in the combination.

First Embodiment

A first embodiment of the present disclosure will be described with reference to FIG. 1 to FIG. 7. In the first embodiment, a refrigerant cycle device according to the present disclosure is typically applied to an air conditioner 1 for an electric vehicle in which a driving force for a vehicle travel is obtained from a traveling electric motor. In the electric vehicle, the air conditioner 1 performs air conditioning in a vehicle interior, which is a space to be air-conditioned, and adjusts temperature of a battery 31 as a heat generator.

The air conditioner 1 is capable of switching between a cooling mode, a heating mode, and a dehumidifying-heating mode as air-conditioning modes for performing air-conditioning of the vehicle interior. The cooling mode is an operation mode in which ventilation air to be blown into the vehicle interior is cooled and is blown into the vehicle interior. The heating mode is an operation mode in which the ventilation air is heated and blown into the vehicle interior. The dehumidifying-heating mode is an operation mode for dehumidifying and heating the vehicle interior by reheating the cooled and dehumidified ventilation air and blowing the heated air into the vehicle interior.

Further, the air conditioner 1 is configured to switch whether or not the battery 31 is cooled regardless of the state of the air-conditioning operation mode. Therefore, the operation mode of the air conditioner 1 can be set by the combination of the state of the air-conditioning operation mode and the presence/absence of cooling of the battery 31. Therefore, the operation mode of the air conditioner 1 includes seven operation modes: the cooling mode, the heating mode, the dehumidifying-heating mode, a sole battery cool-down mode, a battery cool-down and cooling mode, a battery cool-down and heating mode, and a battery cool-down and dehumidifying-heating mode.

The sole battery cool-down mode is an operation mode in which the battery 31 is cooled without air-conditioning in the vehicle interior. The battery cool-down and cooling mode is an operation mode in which the battery 31 is cooled, and the cooling of the vehicle interior is performed, at the same time. The battery cool-down and heating mode is an operation mode in which the battery 31 is cooled, and the heating of the vehicle interior is performed, at the same time. The battery cool-down and dehumidifying-heating mode is an operation mode in which the battery 31 is cooled, and the dehumidifying and heating of the vehicle interior is performed, at the same time.

In a heat pump cycle 10 of the vehicular air conditioner 1, an HFC-based refrigerant (specifically, R134a) is employed as a refrigerant, and a subcritical refrigeration cycle is configured in which a high-pressure side refrigerant pressure does not exceed the critical pressure of the refrigerant. The refrigerant is mixed with a refrigerator oil for lubricating a compressor 11. As the refrigerator oil, polyalkylene glycol oil (PAG oil) having compatibility with a liquid-phase refrigerant is employed. Some of the refrigerator oil circulates a refrigerant cycle together with the refrigerant.

Next, a specific configuration of the air conditioner 1 according to the first embodiment will be described with reference to FIGS. 1 to 3. The air conditioner 1 according to the first embodiment includes the heat pump cycle 10, a heating unit 20, a low-temperature heat medium circuit 30, an interior air-conditioning unit 40, and a controller 50.

First, each configuration device of the heat pump cycle 10 in the air conditioner 1 will be described. The heat pump cycle 10 is a vapor-compression type refrigeration cycle device.

The compressor 11 draws, compresses, and discharges the refrigerant in the heat pump cycle 10. The compressor 11 is disposed in a vehicle engine hood. The compressor 11 is an electric compressor that rotationally drives a fixed capacity type compression mechanism having a fixed discharge capacity, by an electric motor. The rotation speed (i.e., refrigerant discharge capacity) of the compressor 11 is controlled by a control signal output from the controller 50 described later.

A refrigerant inlet side of a refrigerant passage 12a of a heat medium-refrigerant heat exchanger 12 is connected to a discharge port of the compressor 11. The heat medium-refrigerator heat exchanger 12 is a high-temperature heat medium-refrigerant heat exchanger configured to dissipate heat of the high-pressure refrigerant discharged from the compressor 11 to a high-temperature heat medium circulating in a high-temperature heat medium circuit 21 of the heating unit 20, so as to heat the heat medium in the high-temperature heat medium circuit 21.

The heat medium-refrigerant heat exchanger 12 includes a refrigerant passage 12a through which the refrigerant of the heat pump cycle 10 is circulated, and a heat medium passage 12b through which the high-temperature heat medium of the high-temperature heat medium circuit 21 is circulated. The heat medium-refrigerant heat exchanger 12 is formed of the same kind of metal (e.g., an aluminum alloy in the first embodiment) having excellent heat conductivity, and respective constituent members are integrated by brazing.

As a result, the high-pressure refrigerant circulating through the refrigerant passage 12a and the high-temperature heat medium circulating through the heat medium passage 12b can exchange heat with each other. The heat medium-refrigerant heat exchanger 12 is an example of a condenser that dissipates heat contained in the high-pressure refrigerant, and constitutes a part of the heating unit 20 described later. As the high-temperature heat medium circulating through the heat medium passage 12b, a solution containing ethylene glycol, an antifreeze solution, or the like can be employed.

A refrigerant branch portion of a three-way joint is connected to an outlet of the refrigerant passage 12a of the heat medium-refrigerant heat exchanger 12. The refrigerant branch portion branches the flow of the liquid-phase refrigerant flowing out of the heat medium-refrigerant heat exchanger 12. In the refrigerant branch portion, one of the three inflow and outflow ports is a refrigerant inflow port, and the other two thereof are refrigerant outflow ports.

The refrigerant inlet side of an interior evaporator 15 is connected to one refrigerant outflow port of the refrigerant branch portion via a first expansion valve 14a. A refrigerant inlet side of a chiller 16 is connected to the other refrigerant outflow port of the refrigerant branch portion via a second expansion valve 14b.

The first expansion valve 14a is used as a decompression unit that reduces the pressure of the refrigerant flowing from the one refrigerant outflow port of the refrigerant branch portion at least in the cooling mode. The first expansion valve 14a is an electric variable throttle mechanism and includes a valve body and an electric actuator, for example. That is, the first expansion valve 14a is a so-called electric expansion valve.

The valve body of the first expansion valve 14a is configured to be capable of changing a passage opening degree (in other words, a throttle opening degree) of the refrigerant passage. The electric actuator has a stepping motor for changing the throttle opening degree of the valve body. An operation of the first expansion valve 14a is controlled by a control signal output from the controller 50.

The first expansion valve 14a includes a variable throttle mechanism having a full opening function of fully opening the refrigerant passage when the throttle opening degree is fully opened and a full closing function of fully closing the refrigerant passage when the throttle opening degree is fully closed. That is, the first expansion valve 14a is capable of preventing the refrigerant from exhibiting a pressure reducing action by fully opening the refrigerant passage.

The first expansion valve 14a is capable of blocking the inflow of the refrigerant to the interior evaporator 15 by closing the refrigerant passage. Therefore, the first expansion valve 14a has both a function as the decompression unit for reducing the pressure of the refrigerant and a function as a refrigerant circuit switching unit for switching the refrigerant circuit.

The refrigerant inlet side of the interior evaporator 15 is connected to the outlet of the first expansion valve 14a. The interior evaporator 15 is an evaporator that evaporates the low-pressure refrigerant and cools the ventilation air W at least in the cooling mode by exchanging heat between the low-pressure refrigerant whose pressure is reduced by the first expansion valve 14a.

Figure 2:
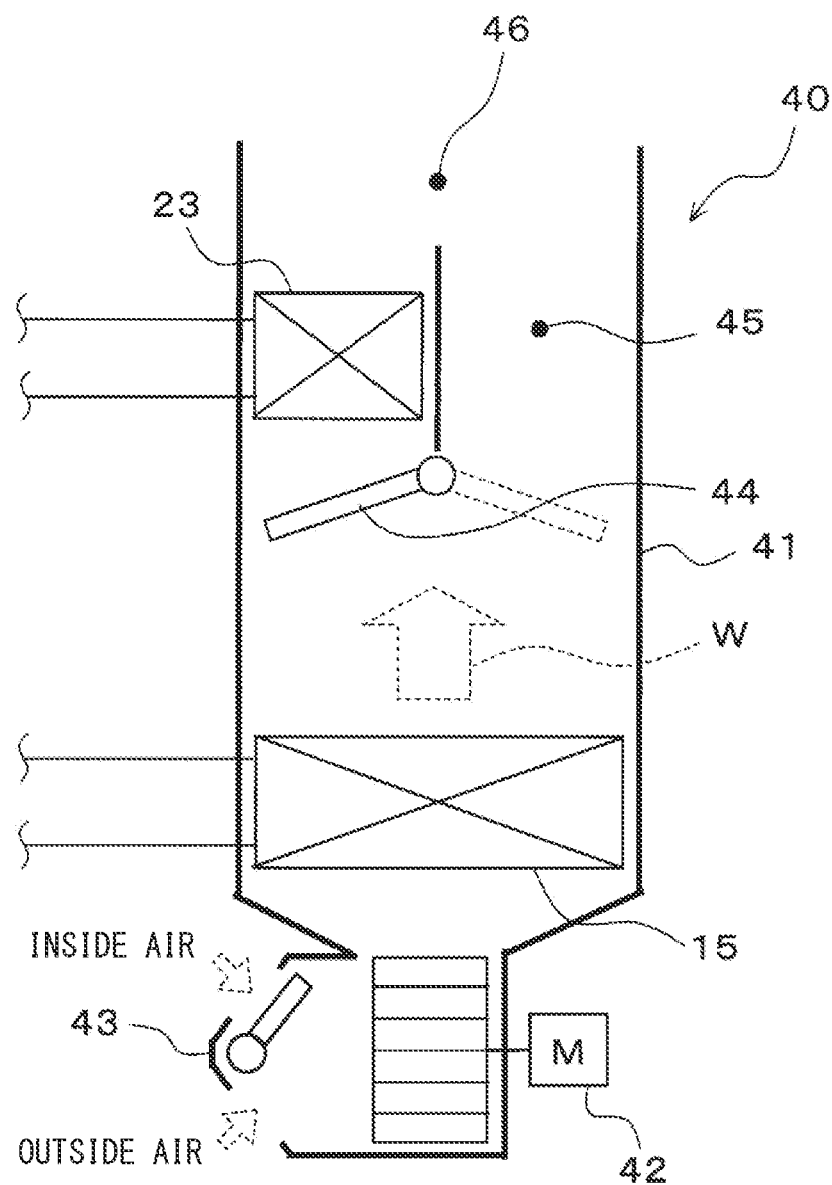
FIG. 2 is an overall configuration diagram of an interior air-conditioning unit according to the first embodiment.

As illustrated in FIG. 2, the interior evaporator 15 is disposed in a casing 41 of an interior air-conditioning unit 40. That is, the indoor evaporator 15 corresponds to an example of a cooling heat exchanger, and the first expansion valve 14a corresponds to an example of a cooling decompression unit.

As illustrated in FIG. 1, the second expansion valve 14b is connected to the other refrigerant outflow port in the refrigerant branch portion. The second expansion valve 14b is a decompression unit that reduces the pressure of the refrigerant flowing from the other refrigerant outflow port of the refrigerant branch portion at least in the heating mode.

Like the first expansion valve 14a, the second expansion valve 14b is an electric variable throttle mechanism and includes a valve body and an electric actuator, for example. That is, the second expansion valve 14b includes a so-called electric expansion valve, and has a full opening function and a full closing function.

The second expansion valve 14b is capable of preventing the refrigerant from exhibiting a pressure reducing action by fully opening the refrigerant passage. The second expansion valve 14b is capable of blocking the inflow of the refrigerant to the chiller 16 by closing the refrigerant passage. That is, the second expansion valve 14b has both a function as the decompression unit for reducing the pressure of the refrigerant and a function as a refrigerant circuit switching unit for switching the refrigerant circuit.

The refrigerant inlet side of the chiller 16 is connected to the outlet of the second expansion valve 14b. The chiller 16 is a heat exchanger for performing heat exchange between the low-pressure refrigerant having been reduced in pressure by the second expansion valve 14b and the low-temperature heat medium circulating through the low-temperature heat-medium circuit 30.

The chiller 16 includes a refrigerant passage 16a for circulating the low-pressure refrigerant decompressed by the second expansion valve 14b, and a heat medium passage 16b for circulating the low-temperature heat medium circulating in the low-temperature heat medium circuit 30. Therefore, the chiller 16 is used as an evaporator that evaporates the low-pressure refrigerant and absorbs heat from the low-temperature heat medium by heat exchange between the low-pressure refrigerant flowing through the refrigerant passage 16a and the low-temperature heat medium flowing through the heat medium passage 16b. That is, the chiller 16 corresponds to an example of a low-temperature heat medium-refrigerant heat exchanger, and the second expansion valve 14b corresponds to an example of a heat-absorbing decompression unit.

An inlet side of an evaporation pressure adjusting valve 17 is connected to a refrigerant outlet of the interior evaporator 16, as shown in FIG. 1. The evaporation pressure adjusting valve 17 is an example of an evaporation pressure adjustment unit that maintains the refrigerant evaporating pressure in the interior evaporator 15 at a predetermined reference pressure or higher. The evaporation pressure adjusting valve 17 includes a mechanical variable throttle mechanism that increases the valve opening degree as the refrigerant pressure on the outlet side of the interior evaporator 15 increases.

The evaporation pressure adjusting valve 17 is configured to maintain the refrigerant evaporation temperature in the interior evaporator 15 at a reference temperature (for example, 1° C. in the present embodiment) or higher at which frosting of the interior evaporator 15 is capable of being restricted.

One refrigerant inlet side of a refrigerant merging portion is connected to the outlet of the evaporation pressure adjusting valve 17. As illustrated in FIG. 1, the other refrigerant inlet side of the refrigerant merging portion is connected to the refrigerant outlet side of the chiller 16. The refrigerant merging portion has a three-way joint structure similar to that of the refrigerant branch portion, and two of three inflow and outflow ports of the three-way joint are used as refrigerant inlets and the remaining one thereof is used as a refrigerant outlet.

The refrigerant merging portion merges the flow of the refrigerant that has flowed from the evaporation pressure adjusting valve 17 and the flow of the refrigerant that has flowed out from the chiller 16. The suction side of the compressor 11 is connected to the refrigerant outlet of the refrigerant merging portion.

Subsequently, the heating unit 20 in the air conditioner 1 will be described. The heating unit 20 is configured to heat the ventilation air W to be supplied to the air-conditioning space, using the high-pressure refrigerant in the heat pump cycle 10 as a heat source.

The heating unit 20 according to the first embodiment is configured by the high-temperature heat medium circuit 21. The high-temperature heat medium circuit 21 is a heat medium circuit that circulates the high-temperature heat medium, and as the high-temperature heat medium, a solution containing ethylene glycol, an antifreeze solution, or the like can be adopted.

The high-temperature heat medium circuit 21 of the heating unit 20 includes the heat medium passage 12b of the heat medium-refrigerant heat exchanger 12, a radiator 22, a heater core 23, an electric heater 24, a high-temperature flow adjustment valve 25, a high-temperature pump 26, and the like.

As described above, in the heat medium passage 12b of the heat medium-refrigerant heat exchanger 12, the high-temperature heat medium is heated by heat exchange with the high-pressure refrigerant flowing through the refrigerant passage 12a. That is, the heat medium on the high temperature side is heated by using the heat pumped by the heat pump cycle 10.

The radiator 22 is a heat exchanger that exchanges heat between the high-temperature heat medium heated by the heat medium-refrigerant heat exchanger 12 and an outside air OA blown from an outside air fan (not shown), and radiates heat of the high-temperature heat medium to the outside air OA. The radiator 22 is an example of an outside air radiator.

The radiator 22 is disposed on a front side in the vehicle engine hood. In accordance with the above-described operation of the outside air fan, the outside air OA flows from the vehicle front side to the vehicle rear side, and passes through the heat exchanging portion of the radiator 22. When the vehicle is traveling, traveling wind is capable of be applied to the radiator 22 from the vehicle front side toward the vehicle rear side.

The heater core 23 is a heat exchanger that heats the ventilation air W by exchanging heat between the high-temperature heat medium heated by the heat medium-refrigerant heat exchanger 12 or the like and the ventilation air W that has passed through the interior evaporator 15. Therefore, the ventilation air W corresponds to an example of a fluid to be temperature adjusted (i.e., a temperature adjustment target fluid), and the heater core 23 corresponds to an example of a heating heat exchanger. As shown in FIGS. 1 and 2, the heater core 23 is arranged in a casing 41 of the interior air-conditioning unit 40.

The electric heater 24 is a heater configured to generate heat when being supplied with electric power, and to heat the high-temperature heat medium flowing through a heat medium passage of the electric heater 24.

As the electric heater 24, for example, a PTC heater having a PTC element (that is, a positive characteristic thermistor) is capable of being used. The electric heater 24 is capable of arbitrarily adjusting the amount of heat for heating the high-temperature heat medium by a control voltage output from the controller 50.

One of the inflow and outflow ports of the high-temperature flow adjustment valve 25 is connected to the outlet side of the heat medium passage in the electric heater 24. The high-temperature flow adjustment valve 25 is constituted by an electric three-way flow amount regulation valve having three inflow and outflow ports. Another one of the inflow and outflow ports of the high-temperature flow adjustment valve 25 is connected to the heat medium inlet of the heater core 23. The rest one of the inflow and outflow ports of the high-temperature flow adjustment valve 25 is connected to the heat medium inlet side of the radiator 22.

Therefore, in the high-temperature heat medium circuit 21, the radiator 22 and the heater core 23 are connected in parallel with respect to the flow of the high-temperature heat medium passing through the heat medium passage 12b of the heat medium-refrigerant heat exchanger 12. The high-temperature flow adjustment valve 25 continuously adjusts the flow ratio between the flow amount of the high-temperature heat medium flowing into the heater core 23 and the flow amount of the high-temperature heat medium flowing into the radiator 22, in the high-temperature heat medium circuit 21.

The merging portion of the three-way joint structure is connected to the outlet of the radiator 22 and the outlet of the heater core 23. In the merging portion, one of the three inflow and outflow ports is used as a flow outlet port, and the other two of them are used as flow inlet ports. Therefore, the merging portion can merge the flow of the high-temperature heat medium passing through the radiator 22 and the flow of the high-temperature heat medium passing through the heater core 23.

A suction port of the high-temperature pump 26 is connected to the flow outlet port at the merging portion. The high-temperature pump 26 is a heat medium pump that pressure-sends and circulates the high-temperature heat medium in the high-temperature heat medium circuit 21. The high-temperature pump 26 is an electric pump in which the number of revolutions (that is, pumping capacity) is controlled by a control voltage output from the controller 50. The heat medium passage 12b of the heat medium-refrigerant heat exchanger 12 is connected to the discharge port of the high-temperature pump 26.

As shown in FIG. 1, in the high-temperature heat medium circuit 21, the flow amount of the high-temperature heat medium flowing to the radiator 22 and the flow amount of the high-temperature heat medium flowing to the heater core 23 can be adjusted continuously by the high-temperature flow adjustment valve 25 arranged at the branch portion.

That is, by controlling the operation of the high-temperature flow adjustment valve 25, the heat amount of the high-temperature heat medium radiated to the outside air OA at the radiator 22 and heat amount of the high-temperature heat medium radiated to the ventilation air W at the heater core 23 can be adjusted.

Next, the low-temperature heat medium circuit 30 in the air conditioner 1 will be described. The low-temperature heat medium circuit 30 is a thermal medium circuit for circulating the low-temperature heat medium. As the low-temperature heat medium, the same fluid as the high-temperature heat medium in the high-temperature heat medium circuit 21 can be adopted.

In the low-temperature heat medium circuit 30, the heat medium passage 16b of a chiller 16, a battery 31, an exterior heat exchanger 32, a three-way valve 33, a low-temperature pump 34, and the like are arranged. A suction port side of the low-temperature pump 34 is connected to an outlet port of the heat medium passage 16b in the chiller 16.

The low-temperature pump 34 is a heat medium pump that pressure-sends the low-temperature heat medium that has passed through the heat medium passage 16b of the chiller 16, in the low-temperature heat medium circuit 30. A basic configuration of the low-temperature pump 34 is the same as that of the high-temperature pump 26.

A branch portion of the three-way joint structure is connected to the discharge port side of the low-temperature pump 34. In the branch portion, one of the three inflow and outflow ports is used as a flow inlet port, and the other two of them are used as flow outlet ports. Therefore, the branch portion can branch the flow of the low-temperature heat medium pressure-sent from the low-temperature pump 34 into two flows.

The inlet side of a heat medium passage in the battery 31 is connected to one of the outlet ports at the branch portion in the low-temperature heat medium circuit 30. The battery 31 supplies electric power to various electric devices of the vehicle. As the battery 31, for example, a rechargeable secondary battery (in this embodiment, a lithium ion battery) is adopted. Since the battery 31 generates heat during charging and discharging, the battery 31 is an example of a heat generator.

The battery 31 is formed by stacking a plurality of battery cells and electrically connecting these battery cells in series or in parallel. In other words, the battery 31 is a battery pack. The output of this type of battery 31 tends to decrease when the temperature becomes low, and the deterioration thereof easily progresses when the temperature of the battery 31 becomes high. Therefore, the temperature of the battery 31 needs to be maintained within an appropriate temperature range (for example, between 15° C. and 55° C. inclusively) in which the charge/discharge capacity of the battery 31 can be fully utilized.

In the air conditioner 1, the low-temperature heat medium is made to pass through the heat medium passage of the battery 31 to exchange heat, so that the heat generated by the battery 31 is absorbed by the low-temperature heat medium, and the temperature of the battery 31 can be adjusted. That is, the battery 31 is connected to be cooled by the low-temperature heat medium in the low-temperature heat medium circuit 30, and the temperature of the battery 31 can be adjusted and maintained within a predetermined temperature range.

The inlet side of the exterior heat exchanger 32 is connected to the other outlet port at the branch portion of the low-temperature heat medium circuit 30. The exterior heat exchanger 32 is a heat exchanger that exchanges heat between the low-temperature heat medium discharged from the low-temperature pump 34 and the outside air OA blown by an outside air fan (not shown).

The exterior heat exchanger 32 is arranged on the front side within an inside of a drive device chamber. Therefore, traveling wind can be applied to the exterior heat exchanger 32 when the vehicle is traveling. The exterior heat exchanger 32 may be integrally formed with the radiator 22 and the like.

As shown in FIG. 1, the three-way valve 33 is connected to an outlet side of the heat medium passage of the battery 31 and an outlet side of the exterior heat exchanger 32. The three-way valve 33 is constituted by an electric three-way valve having three inflow and outflow ports.

That is, the outlet side of the heat medium passage of the battery 31 is connected to one of the inflow port of the three-way valve 33, and the outlet side of the exterior heat exchanger 32 is connected to the other inflow port of the three-way valve 33. The inlet side of the heat medium passage 16b in the chiller 16 is connected to the outflow port of the three-way valve 33.

Therefore, the low-temperature heat medium circuit 30 can switch the flow of the low-temperature heat medium in the low-temperature heat medium circuit 30 by controlling the operation of the three-way valve 33.

For example, in the low-temperature heat medium circuit 30, the three-way valve 33 can be controlled so that the chiller 16 and the battery 31 communicate with each other while the flow of the low-temperature heat medium in the exterior heat exchanger 32 is closed. In this case, the flow of the low-temperature heat medium is switched so that the entire amount of the low-temperature heat medium that has passed through the chiller 16 flows through the heat medium passage of the battery 31.

Because the low-temperature heat medium cooled by the chiller 16 is supplied to the battery 31, the battery 31 can be cooled. In other words, the waste heat of the battery 31, caused while the battery 31 is cooled, can be absorbed to the low-pressure refrigerant of the heat pump cycle 10 by heat exchange in the chiller 16.

Alternatively, in the low-temperature heat medium circuit 30, the three-way valve 33 can be controlled so that the chiller 16 and the exterior heat exchanger 32 communicate with each other while the flow of the low-temperature heat medium flowing in the battery 31 is closed. In this case, the flow of the low-temperature heat medium is switched so that the entire amount of the low-temperature heat medium that has passed through the chiller 16 flows through the exterior heat exchanger 32.

Accordingly, the low-temperature heat medium cooled by the chiller 16 can be supplied to the exterior heat exchanger 32. Therefore, if the temperature of the low-temperature heat medium is lower than the outside air temperature, heat can be absorbed from the outside air OA. As a result, the outside air OA can be used as a heat source.

The air conditioner 1 is capable of cooling and adjusting the temperature of the battery 31 by using the low-temperature heat medium circuit 30. Further, the air conditioner 1 can use the outside air OA as a heat source, by using the exterior heat exchanger 32.

As shown in FIG. 1, in the low-temperature heat medium circuit 30, the three-way valve 33 is configured to adjust the flow amount of the low-temperature heat medium flowing to the battery 31 and the flow amount of the low-temperature heat medium flowing to the exterior heat exchanger 32. That is, by controlling the operation of the three-way valve 33, the amount of heat absorbed by the low-temperature heat medium in each of the battery 31 and the exterior heat exchanger 32 can be changed and adjusted.

That is, the battery 31 and the exterior heat exchanger 32 correspond to an example of a heat absorption device, and the three-way valve 33 corresponds to an example of a heat absorption adjusting unit. Further, the three-way valve 33 is an example of a flow amount adjusting unit that adjusts the flow amount of the low-temperature heat medium flowing into the battery 31 and the exterior heat exchanger 32.

Further, the battery 31 and the exterior heat exchanger 32 have different temperature zones (specifically, heat absorption temperature zones). That is, the battery 31 corresponds to an example of the first heat absorption unit, and the exterior heat exchanger 32 corresponds to an example of the second heat absorption unit.

Next, the interior air-conditioning unit 40 constituting the air conditioner 1 will be described with reference to FIG. 2. In the air conditioner 1, the interior air-conditioning unit 40 is a unit for blowing out the ventilation air W, of which the temperature is adjusted by the heat pump cycle 10 to an appropriate place, into the vehicle interior. The interior air-conditioning unit 40 is disposed inside an instrument panel at a foremost portion of the vehicle interior.

The interior air-conditioning unit 40 is configured by accommodating a blower 42, an interior evaporator 15, a heater core 23, and the like in an air passage formed inside a casing 41 which forms an outer shell of the interior air-conditioning unit. The casing 41 defines the air passage for the ventilation air W to be blown into the vehicle interior. The casing 41 is formed of a resin (specifically, polypropylene) having a certain degree of elasticity and excellent strength.

As illustrated in FIG. 2, an inside-outside air switch device 43 is disposed on the most upstream side of the ventilation air flow of the casing 41. The inside-outside air switching device 43 switches between inside air (i.e., air inside the vehicle interior) and outside air (i.e., air outside the vehicle interior), and introduces the switched air into the casing 41.

The inside-outside air switch device 43 continuously adjusts opening areas of an inside air introduction port for introducing the inside air into the casing 41 and an outside air introduction port for introducing the outside air by an inside-outside air switch door, and changes an introducing ratio of an introduction air volume of the inside air and an introduction air volume of the outside air. The inside-outside air switch door is driven by an electric actuator for the inside-outside air switch door. Operation of the electric actuator is controlled in accordance with a control signal output from the controller 50.

The blower 42 is disposed downstream of the inside-outside air switch device 43 in flow of the ventilation air. The blower 42 is constituted by an electric blower in which a centrifugal multi-blade fan is driven by an electric motor. The blower 42 blows the air, which is taken in through the inside-outside air switch device 43, toward the vehicle interior. The number of revolutions (that is, the blowing capacity) of the blower 42 is controlled by a control voltage output from the controller 50.

The interior evaporator 15 and the heater core 23 are disposed on the air flow downstream side of the blower 42 in this order with respect to the flow of the ventilation air. That is, the interior evaporator 15 is disposed on the ventilation airflow upstream side of the heater core 23.

A cold air bypass passage 45 is provided in the casing 41. The cold air bypass passage 45 is an air passage for flowing the ventilation air W that has passed through the interior evaporator 15 to the downstream side while bypassing the heater core 23.

An air mix door 44 is disposed at a ventilation airflow downstream side of the interior evaporator 15 and at the ventilation airflow upstream side of the heater core 23. The air mix door 44 adjusts an air flow ratio of an air volume of the ventilation air W passing through the heater core 23 to an air volume of the ventilation air W passing through the cold air bypass passage 45, among the ventilation air W after passing through the interior evaporator 15.

The air mixing door 44 is driven by an electric actuator for driving the air mixing door. An operation of the electric actuator is controlled by a control signal output from the controller 50.

A mixing space 46 is provided on an air flow downstream side of the heater core 23. In the mixing space 46, the ventilation air W which has been heated by the heater core 23 and the ventilation air W that has passed through the cold air bypass passage 45 and has not been heated by the heater core 23 are mixed.

Opening holes for blowing out the ventilation air (i.e., air conditioning wind), which has been mixed in the mixing space 46, into the vehicle interior are disposed at the most downstream portion of the ventilation air flow of the casing 41. The opening holes include a face opening hole, a foot opening hole, and a defroster opening hole (not shown).

The face opening hole is an opening hole for blowing the air conditioning wind out toward the upper body of an occupant in the vehicle interior. The foot opening hole is an opening hole for blowing the air conditioning wind out toward the foot of the occupant. The defroster opening hole is an opening hole for blowing the air conditioning wind out toward the inner surface of the vehicle front window glass.

The face opening hole, the foot opening hole, and the defroster opening hole are respectively connected through ducts defining air passages to a face vent, a foot vent, and a defroster vent (any of them is not shown) provided in the vehicle compartment.

Therefore, the air mix door 44 adjusts the air flow ratio between the air volume passing through the heater core 23 and the air volume passing through the cold air bypass passage 45, thereby adjusting the temperature of the air conditioning wind mixed in the mixing space 46. Thus, the temperature of the ventilation air (air conditioning wind) blown from each blowing port into the vehicle interior is also adjusted.

A face door, a foot door, and a defroster door (all not illustrated) are disposed on the ventilation air flow upstream side of the face opening hole, the foot opening hole, and the defroster opening hole, respectively. The face door adjusts the opening area of the face opening hole. The foot door adjusts the opening area of the foot opening hole. The defroster door adjusts the opening area of the defroster opening hole.

The face door, the foot door, and the defroster door constitute a blowing mode switching device for switching a blowing port through which the air conditioning wind is blown out. The face door, the foot door, and the defroster door are connected to an electric actuator for driving the blowing port mode doors through a link mechanism or the like, and are rotationally operated in conjunction with each other. Operation of the electric actuator is controlled in accordance with a control signal output from the controller 50.

Next, a control system of the air conditioner 1 according to the first embodiment will be described with reference to FIG. 3. The controller 50 is configured by a well-known microcomputer including a CPU, a ROM, a RAM, and the like, and peripheral circuits of the microcomputer.

The controller 50 performs various calculations and processes based on control programs stored in the ROM, and controls operations of various control target devices connected to the output side thereof. The control target devices include the compressor 11, the first expansion valve 14a, the second expansion valve 14b, the electric heater 24, the high-temperature flow adjustment valve 25, the high-temperature pump 26, the three-way valve 33, the low-temperature pump 34, the blower 42, and the like.

Figure 3:
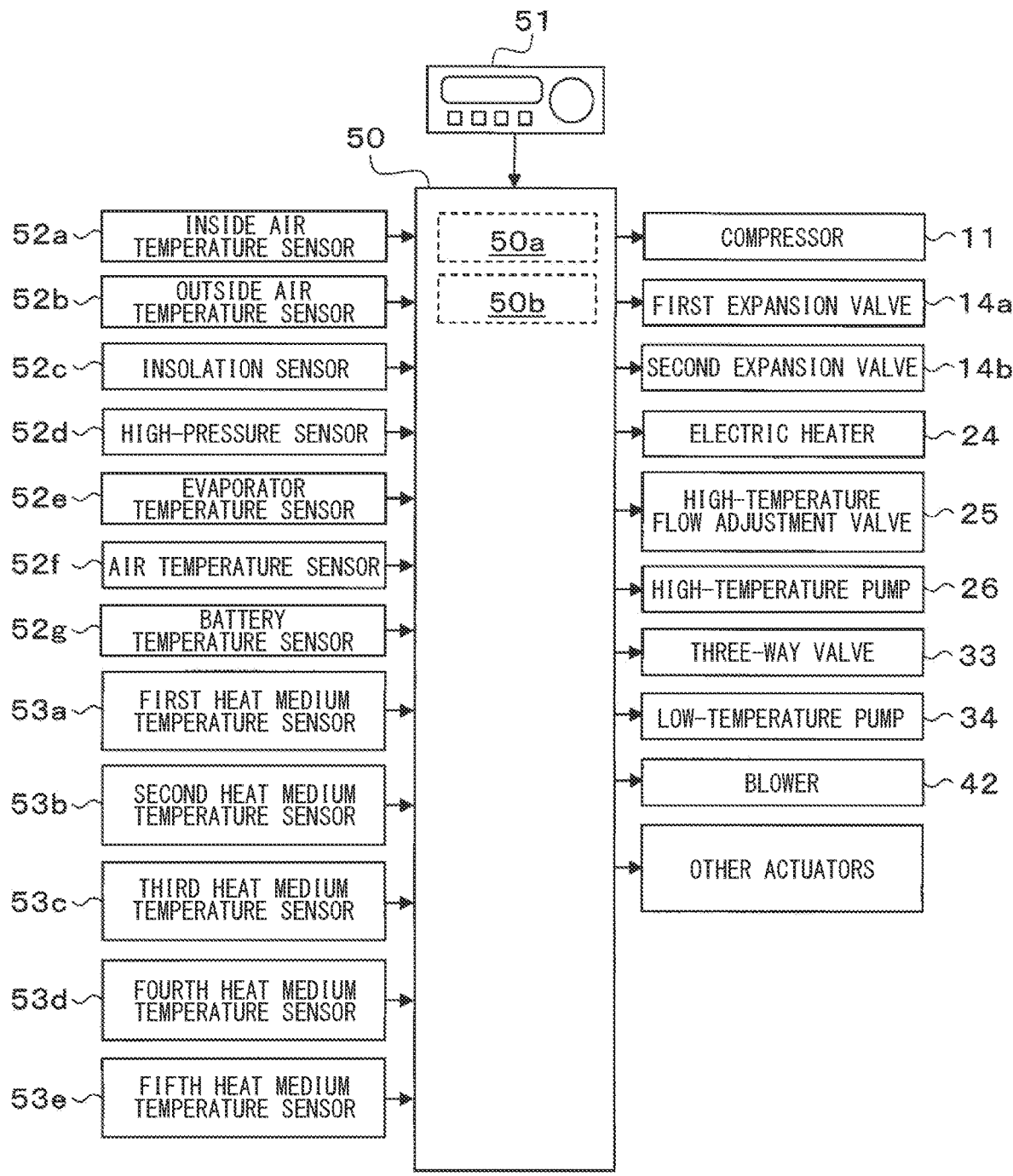
FIG. 3 is a block diagram illustrating a control system for the air conditioner according to the first embodiment.

As illustrated in FIG. 3, an air-conditioning control sensor group is connected to the input side of the controller 50. The air-conditioning control sensor group includes an inside air temperature sensor 52a, an outside air temperature sensor 52b, an insolation sensor 52c, a high-pressure sensor 52d, an evaporator temperature sensor 52e, and a ventilation air temperature sensor 52f and a battery temperature sensor 52g. Detection signals of the air-conditioning control sensor groups are input to the controller 50.

The inside air temperature sensor 52a is an inside air temperature detector that detects a vehicle interior temperature (i.e., inside air temperature) Tr. The outside air temperature sensor 52b is an outside air temperature detector that detects the vehicle exterior air temperature (i.e., outside air temperature) Tam. The insolation sensor 52c is an insolation amount detector that detects an insolation amount As irradiated into the vehicle interior. The high-pressure sensor 52d is a refrigerant pressure detector that detects a high-pressure refrigerant pressure Pd of the refrigerant flow channel from the discharge port of the compressor 11 to the inlet side of the first expansion valve 14a or the second expansion valve 14b.

The evaporator temperature sensor 52e is an evaporator temperature detector that detects a refrigerant evaporation temperature (evaporator temperature) Tefin in the interior evaporator 15. The air temperature sensor 52f is a ventilation air temperature detector that detects a ventilation air temperature TAV blown into the vehicle interior. The battery temperature sensor 52g is a battery temperature detector that detects a battery temperature TBA (that is, the temperature of the battery 31).

The battery temperature sensor 52a includes a plurality of temperature detection parts and detects temperatures at a plurality of locations of the battery 31. Thus, the controller 50 can also detect a temperature difference of each part of the battery 31. Further, as the battery temperature TBA, the average value of the detection values of the plurality of temperature detection parts is adopted.

A plurality of heat medium temperature sensors are connected to the input side of the controller 50 in order to detect the temperature of the heat medium in each heat medium circuit of the high-temperature heat medium circuit 21 and the low-temperature heat medium circuit 30. The plurality of heat medium temperature sensors includes a first heat medium temperature sensor 53a, a second heat medium temperature sensor 53b, a third heat medium temperature sensor 53c, a fourth heat medium temperature sensor 53d and a fifth heat medium temperature sensor 53e.

The first heat medium temperature sensor 53a is arranged at an outlet portion in the heat medium passage of the electric heater 24, and detects the temperature of the high-temperature heat medium flowing out from the electric heater 24. The second heat medium temperature sensor 53b is arranged at an outlet portion of the radiator 22 and detects the temperature of the high-temperature heat medium that has passed through the radiator 22. The third heat medium temperature sensor 53c is arranged at an outlet portion of the heater core 23, and detects the temperature of the high-temperature heat medium that has passed through the heater core 23.

The fourth heat medium temperature sensor 53d is arranged at an outlet portion of the heat medium passage 16b of the chiller 16 and detects the temperature of the low-temperature heat medium flowing out of the chiller 16. The fifth heat medium temperature sensor 53e is arranged at an outlet portion of the heat medium passage in the battery 31 and detects the temperature of the low-temperature heat medium flowing out from the heat medium passage of the battery 31.

The air conditioner 1 is configured to switch a flow of the heat medium in the high-temperature heat medium circuit 21 of the heating unit 20 and a flow of the heat medium of the low-temperature heat medium circuit 30, based on the detection values of the first heat medium temperature sensor 53a to the fifth heat medium temperature sensor 53e. Therefore, the air conditioner 1 can manage the heat in the vehicle by using the high-temperature heat medium and the low-temperature heat medium.

An operation panel 51 disposed around an instrument panel that is located on the front side of the vehicle interior is connected to an input side of the controller 50. Multiple operation switches are disposed on the operation panel 51. Accordingly, operation signals from multiple operation switches are input to the controller 50. The various operation switches on the operation panel 51 include an automatic switch, a cooling switch, an air volume setting switch, a temperature setting switch, and the like.

The automatic switch is operated when the automatic control operation of the air conditioner 1 is set or released. The cooling switch is operated when a request is made to cool the vehicle interior. The air volume setting switch is operated when manually setting the air volume of the blower 42. The temperature setting switch is operated when a target temperature Tset is set in the vehicle interior.

In the controller 50, control units for controlling various control target devices connected to the output side of the controller 50 are integrally configured, and a configuration (hardware and software) for controlling the operation of each control target device constitutes a control unit for controlling the operation of each control target device.

For example, in the controller 50, a configuration circuit that controls the operation of the three-way valve 33, which is the heat absorption adjusting unit of the low-temperature heat medium circuit 30, is a heat absorption adjustment control unit 50a. Among the controller 50, an electric heater control unit 50b controls the amount of heat generated by the electric heater 24 that heats the high-temperature heat medium. The electric heater control unit 50b corresponds to a heater control unit.

The operation of the air conditioner 1 according to the first embodiment will be described. As described above, in the air conditioner 1 according to the first embodiment, an appropriate operation mode is capable of being switched from multiple operation modes. The switching of these operation modes is performed by executing a control program stored in advance in the controller 50.

More specifically, in the control program, a target outlet temperature TAO of the ventilation air to be blown into the vehicle interior is calculated based on detection signals detected by the air conditioning control sensor group and operation signals output from the operation panel 51.

Specifically, the target outlet temperature TAO is calculated by the following formula F1.

$$TAO = Kset \times Tset - Kr \times Tr - Kam \times Tam - Ks \times As + C \quad (F1)$$

Tset is the target set temperature of the vehicle interior (i.e., a vehicle-interior set temperature) set by the temperature setting switch, Tr is an inside air temperature detected by the inside air temperature sensor 52a, Tam is an outside air temperature detected by the outside air temperature sensor 52b, and As is an amount of solar irradiance detected by the insolation sensor 52c. Kset, Kr, Kam, and Ks are control gains, and C is a constant for correction.

In the control program, when the target outlet temperature TAO is lower than a predetermined cooling reference temperature a with the air conditioner switch of the operation panel 51 turned on, the air-conditioning operation mode is switched to the cooling mode.

In the control program, when the target outlet temperature TAO is equal to or higher than the cooling reference temperature a with the air conditioner switch of the operation panel 51 turned on, the air-conditioning operation mode is switched to a dehumidifying-heating mode. When the target outlet temperature TAO is equal to or higher than the cooling reference temperature a with the air conditioner switch not turned on, the operation mode is switched to a heating mode.

Then, in the control program, the presence or absence of cooling of the battery 31 is switched according to the battery temperature TBA. Specifically, when the battery temperature TBA becomes equal to or higher than a reference battery temperature KTBA, the operation mode for cooling the battery 31 is switched.

Therefore, the operation mode in the air conditioner 1 is determined by a combination of the air-conditioning operation mode and the operation mode indicating the presence or absence of cooling of the battery 31. For example, when the battery temperature TBA becomes equal to or higher than the reference battery temperature KTBA in a state where the vehicle interior is not air-conditioned, the operation mode of the air conditioner 1 is switched to a sole battery cool-down mode in which the battery 31 is cooled without performing the vehicle interior air conditioning.

Therefore, the operation mode of the air conditioner 1 includes a cooling mode, a heating mode, a dehumidifying-heating mode, a sole battery cool-down mode, a battery cool-down and cooling mode, a battery cool-down and heating mode, and a battery cool-down and dehumidifying-heating mode. Each of the operation mode will be hereinafter described.

(a) Cooling Mode

The cooling mode is an operation mode in which the ventilation air W is cooled by the interior evaporator 15 and blown into the vehicle interior, without cooling the battery 31. In the cooling mode, the controller 50 opens the first expansion valve 14a with a predetermined throttle opening and fully closes the second expansion valve 14b.

Therefore, in the heat pump cycle 10 during the cooling mode, the refrigerant circulates in the order of the compressor 11, the heat medium-refrigerant heat exchanger 12, the first expansion valve 14a, the interior evaporator 15, the evaporation pressure adjusting valve 17, and the compressor 11. That is, in the cooling mode, the heat pump cycle 10 is switched to a refrigerant circuit in which the ventilation air W blown by the blower 42 is cooled by the interior evaporator 15.

In this cycle configuration, the controller 50 controls operations of various control target devices connected to the output side thereof. For example, the controller 50 controls the operation of the compressor 11 so that a refrigerant evaporation temperature Tefin measured by the evaporator temperature sensor 52e becomes a target evaporation temperature TEO. The target evaporation temperature TEO is determined based on the target outlet temperature TAO with reference to a cooling mode control map stored in advance in the controller 50.

Specifically, in this control map, the target evaporation temperature TEO is increased along with the increase of the target outlet temperature TAO so that the air temperature TAV measured by the air temperature sensor 52f approaches the target outlet temperature TAO. The target evaporation temperature TEO is determined to be a value of a range (specifically, 1° C. or more) in which frosting of the interior evaporator 15 is capable of being restricted.

The controller 50 determines a control voltage (blowing capacity) of the blower 42 based on the target outlet temperature TAO with reference to the control map stored in advance in the controller 50. Specifically, in this control map, the blowing air volume of the blower 42 is maximized in a cryogenic range (maximum cooling range) and an extremely high temperature range (maximum heating range) of the target outlet temperature TAO, and the blowing air volume is decreased as the blowing air volume approaches an intermediate temperature range.

In the heating unit 20 of the cooling mode, the controller 50 controls the operation of the high-temperature pump 26 so as to exhibit a predetermined water pumping capacity in the cooling mode. Further, the controller 50 controls the high-temperature flow adjustment valve 25 so as to cause the radiator 22 and the electric heater 24 to communicate with each other in the flow of the heat medium and to close the flow of the heat medium flowing into the heater core 23.

As a result, in the high-temperature heat medium circuit 21 during the cooling mode, a high-temperature heat medium circulates the high-temperature pump 26, the heat medium-refrigerant heat exchanger 12, the electric heater 24, the high-temperature flow adjustment valve 25, the radiator 22, and the high-temperature pump 26 in this order.

Further, in the low-temperature heat medium circuit 30 during the cooling mode, the controller 50 keeps the stop state without operating the devices of the low-temperature heat medium circuit 30.

As described above, in the heat pump cycle 10 of the cooling mode, the high-pressure refrigerant discharged from the compressor 11 flows into the heat medium-refrigerant heat exchanger 12. Since the high-temperature pump 26 is operating, the high-pressure refrigerant is heat-exchanged with the high-temperature heat medium of the high-temperature heat medium circuit 21 in the heat medium-refrigerant heat exchanger 12, so that the high-pressure refrigerant is cooled and condensed, and the high-temperature heat medium is heated.

In the high-temperature heat medium circuit 21, the high-temperature heat medium heated by the heat medium-refrigerant heat exchanger 12 flows into the radiator 22 via the electric heater 24 and the high-temperature flow adjustment valve 25. The high-temperature heat medium flowing into the radiator 22 exchanges heat with the outside air OA to radiate heat to the outside air OA. The high-temperature heat medium cooled by the radiator 22 is drain into the high-temperature pump 26 and pressure-fed to the heat medium passage 12b of the heat medium-refrigerant heat exchanger 12.

On the other hand, the high-pressure refrigerant cooled in the refrigerant passage 12a of the heat medium-refrigerant heat exchanger 12 flows into the first expansion valve 14a via the refrigerant branch portion and is reduced in pressure. The throttle opening degree of the first expansion valve 14a is adjusted so that a degree of superheat of the refrigerant on the outlet side of the interior evaporator 15 becomes approximately 3° C., for example.

The low-pressure refrigerant whose pressure is reduced by the first expansion valve 14a flows into the interior evaporator 15. The refrigerant that has flowed into the interior evaporator 15 absorbs heat from the ventilation air W blown from the blower 42 and evaporates to cool the ventilation air W. The refrigerant flowing out of the interior evaporator 15 is drawn into the compressor 11 via the evaporation pressure adjusting valve 17 and the refrigerant merging portion, and is compressed again in the compressor 11.

Therefore, in the cooling mode of the air conditioner 1, the ventilation air W which has been cooled by the interior evaporator 15 is blown into the vehicle interior, thereby cooling the vehicle interior.

In the cooling mode, the electric heater 24 is not operated because the high-temperature heat medium circuit 21 is configured to dissipate the heat of the high-temperature heat medium to the outside air OA at the radiator 22. Needless to say, the electric heater 24 may be operated as needed.

(b) Heating Mode

The heating mode is an operation mode in which the ventilation air W is heated by the heater core 23 and is blown into the vehicle interior without cooling the battery 31. In the heating mode, the controller 50 opens the second expansion valve 14b at a predetermined throttle opening degree, and brings the first expansion valve 14a into a fully closed state.

Therefore, in the heating mode of the heat pump cycle 10, a heat pump cycle is configured in which the refrigerant circulates in the order of the compressor 11, the heat medium-refrigerant heat exchanger 12, the second expansion valve 14b, the chiller 16, and the compressor 11.

That is, in the heating mode, the refrigerant is allowed to flow into the chiller 16, so that the heat absorbed from the heat medium of the low-temperature heat medium circuit 30 is drawn up, and the refrigerant circuit capable of using for heating the ventilation air W is switched.

In this cycle configuration, the controller 50 controls operations of various control target devices connected to the output side thereof. For example, the controller 50 controls the operation of the compressor 11 so that the high-pressure refrigerant pressure Pd measured by the high-pressure sensor 52d becomes a target high-pressure PCO.

The target high-pressure PCO is determined based on the target outlet temperature TAO with reference to a heating mode control map stored in advance in the controller 50.

More specifically, in the control map of the heating mode, the target high-pressure PCO increases with an increase in the target outlet temperature TAO so that the ventilation air temperature TAV approaches the target outlet temperature TAO.

The controller 50 determines a control voltage (blowing capacity) of the blower 42, in the same manner as that in the cooling mode. The controller 50 controls the operation of the air mix door 44 so that the cold air bypass passage 45 is fully closed and the air flow passage in the heater core 22 is fully opened.

In the heating unit 20 of the heating mode, the controller 50 controls the operation of the high-temperature pump 26 so as to exhibit a predetermined water pumping capacity in the heating mode. Further, the controller 50 controls the high-temperature flow adjustment valve 25 so as to cause the heater core 23 and the electric heater 24 to communicate with each other in the flow of the heat medium and to close the flow of the heat medium flowing into the radiator 22.

As a result, in the high-temperature heat medium circuit 21 during the heating mode, a high-temperature heat medium circulates the high-temperature pump 26, the heat medium-refrigerant heat exchanger 12, the electric heater 24, the high-temperature flow adjustment valve 25, the heater core 23, and the high-temperature pump 26 in this order.

In the low-temperature heat-medium circuit 30 during the heating mode, the controller 50 controls the operation of the low-temperature pump 34 so as to exhibit the water pumping capacity in the heating mode. For example, in the low-temperature heat medium circuit 30, the three-way valve 33 can be controlled so that the chiller 16 and the exterior heat exchanger 32 communicate with each other while the flow of the low-temperature heat medium flowing in the battery 31 is closed.

As a result, in the low-temperature heat medium circuit 30 of the heating mode, the low-temperature heat medium circulates in the order of the low-temperature pump 34, the exterior heat exchanger 32, the three-way valve 33, the chiller 16, and the low-temperature pump 34.

When the low-temperature heat medium of the low-temperature heat medium circuit 30 passes through the exterior heat exchanger 32, the low-temperature heat medium exchanges heat with the outside air OA. Because the low-temperature heat medium is cooled by the chiller 16, heat is absorbed from the outside air OA in accordance with a temperature difference between the outside air OA and the low-temperature heat medium of the exterior heat exchanger 32, in the low-temperature heat medium circuit 30. That is, the air conditioner 1 can use the outside air OA as a heat source for heating in the heating mode.

In the heat pump cycle 10 during the heating mode, the high-pressure refrigerant flowing out of the refrigerant passage 12a of the heat medium-refrigerant heat exchanger 12 flows into the second expansion valve 14b and is reduced in pressure. The throttle opening degree of the second expansion valve 14b is adjusted so that the refrigerant on the outlet side of the chiller 16 is in a gas-liquid two-phase state. The low-pressure refrigerant from the second expansion valve 14b evaporates by exchanging heat with the low-temperature heat medium in the chiller 16, and can absorb heat from the low-temperature heat medium.

The refrigerant absorbing heat from the low-temperature heat medium in the chiller 16 is compressed by the compressor 11, and is discharged to the heat medium-refrigerant heat exchanger 12 as a high-pressure refrigerant. Since the high-temperature pump 26 is operating, the high-pressure refrigerant is heat-exchanged with the high-temperature heat medium of the high-temperature heat medium circuit 21 in the heat medium-refrigerant heat exchanger 12, so that the high-pressure refrigerant is cooled and condensed. As a result, the high-temperature heat medium is heated by the heat of the high-pressure refrigerant.

In the high-temperature heat medium circuit 21, the high-temperature heat medium heated by the heat medium-refrigerant heat exchanger 12 flows into the heater core 23 through the high-temperature flow adjustment valve 25. Since the air mixing door 44 fully opens the air flow passage on the heater core 23 side, the high-temperature heat medium flowing into the heater core 23 exchanges heat with the ventilation air W having passed through the interior evaporator 15 to radiate heat to the ventilation air W.

Thus, in the heating mode, the ventilation air W is heated, and the temperature of the ventilation air W approaches the target outlet temperature TAO. The high-temperature heat medium flowing out of the heater core 23 is drain into the high-temperature pump 26 and pressure-fed to the heat medium passage 12b of the heat medium-refrigerant heat exchanger 12.

That is, in the air conditioner 1 of the heating mode, the heat absorbed from the outside air OA via the low-temperature heat medium circuit 30 is pumped by the heat pump cycle 10 and uses it for heating the ventilation air W via the high-temperature heat medium circuit 21.

(c) Dehumidifying-Heating Mode

The dehumidifying-heating mode is an operation mode in which the ventilation air W cooled by the interior evaporator 15 is heated by the heater core 23 and is blown into the vehicle interior without cooling the battery 31. In the dehumidifying-heating mode, the controller 50 opens the first expansion valve 14a and the second expansion valve 14b respectively at predetermined throttle opening degrees.

Therefore, in the heat pump cycle 10 during the dehumidifying-heating mode, the refrigerant circulates in the order of the compressor 11, the heat medium-refrigerant heat exchanger 12, the first expansion valve 14a, the interior evaporator 15, the evaporation pressure adjusting valve 17, and the compressor 11. At the same time, the refrigerant circulates in the order of the compressor 11, the heat medium-refrigerant heat exchanger 12, the second expansion valve 14b, the chiller 16, and the compressor 11.

That is, in the heat pump cycle 10 during the dehumidifying-heating mode, the heat pump cycle is configured in which the interior evaporator 15 and the chiller 16 are connected in parallel with respect to the flow of the refrigerant flowing out of the heat medium-refrigerant heat exchanger 12.

In this cycle configuration, the controller 50 controls operations of various control target devices connected to the output side thereof. For example, the controller 50 controls the operation of the compressor 11 so that the high-pressure refrigerant pressure Pd measured by the high-pressure sensor 52d becomes a target high-pressure PCO, similarly to the heating mode.

In the heating unit 20 of the dehumidifying-heating mode, the controller 50 controls the operation of the high-temperature pump 26 so as to exhibit a predetermined water pumping capacity in the dehumidifying-heating mode. Further, the controller 50 controls the high-temperature flow adjustment valve 25 so as to cause the heater core 23 and the electric heater 24 to communicate with each other in the flow of the heat medium and to close the flow of the heat medium flowing into the radiator 22.

As a result, in the high-temperature heat medium circuit 21 during the dehumidifying-heating mode, a high-temperature heat medium circulates the high-temperature pump 26, the heat medium-refrigerant heat exchanger 12, the electric heater 24, the high-temperature flow adjustment valve 25, the heater core 23, and the high-temperature pump 26 in this order.

In the low-temperature heat-medium circuit 30 during the dehumidifying-heating mode, the controller 50 controls the operation of the low-temperature pump 34 so as to exhibit the water pumping capacity in the dehumidifying-heating mode. For example, in the low-temperature heat medium circuit 30, the three-way valve 33 can be controlled so that the chiller 16 and the exterior heat exchanger 32 communicate with each other while the flow of the low-temperature heat medium flowing in the battery 31 is closed.

As a result, in the low-temperature heat medium circuit 30 of the dehumidifying-heating mode, the low-temperature heat medium circulates in the order of the low-temperature pump 34, the exterior heat exchanger 32, the three-way valve 33, the chiller 16, and the low-temperature pump 34.

In the heat pump cycle 10 during the dehumidifying-heating mode, the high-pressure refrigerant flowing out of the refrigerant passage 12a of the heat medium-refrigerant heat exchanger 12 is branched at the refrigerant branch portion. One of the high-pressure refrigerants, branched at the refrigerant branch portion, flows into the first expansion valve 14a and is decompressed. The low-pressure refrigerant whose pressure is reduced by the first expansion valve 14a flows into the interior evaporator 15.

The refrigerant flowing into the interior evaporator 15 absorbs heat from the ventilation air W blown from the blower 42 and evaporates to cool the ventilation air W. The refrigerant flowing out of the interior evaporator 15 is drawn into the compressor 11 via the evaporation pressure adjusting valve 17 and the refrigerant merging portion, and is compressed again in the compressor 11.

The other one of the high-pressure refrigerants, branched at the refrigerant branch portion, flows into the second expansion valve 14b and is decompressed. The low-pressure refrigerant decompressed by the second expansion valve 14b flows into the chiller 16 and exchanges heat with the low-temperature heat medium flowing through the heat medium passage 16b of the chiller 16. The low-pressure refrigerant from the second expansion valve 14b evaporates by exchanging heat with the low-temperature heat medium in the chiller 16, and can absorb heat from the low-temperature heat medium. The refrigerant absorbing heat from the low-temperature heat medium at the chiller 16 is drawn into the compressor 11 and compressed again.

The high-pressure refrigerant discharged from the compressor 11 exchanges heat with the high-temperature heat medium of the heat medium-refrigerant heat exchanger 12 in the high-temperature heat medium circuit 21, and is cooled and condensed. As a result, the high-temperature heat medium is heated by the heat of the high-pressure refrigerant.

In the high-temperature heat medium circuit 21, the high-temperature heat medium heated by the heat medium-refrigerant heat exchanger 12 flows into the heater core 23 through the high-temperature flow adjustment valve 25. The high-temperature heat medium flowing into the heater core 23 exchanges heat with the ventilation air W having been cooled by the interior evaporator 15 so as to dissipate heat to the ventilation air W.

As a result, in the dehumidifying-heating mode, the ventilation air W cooled by the interior evaporator 15 can be heated at the heater core 23, and dehumidifying and heating of the vehicle interior can be performed. The high-temperature heat medium flowing out of the heater core 23 is drain into the high-temperature pump 26 and pressure-fed to the heat medium passage 12b of the heat medium-refrigerant heat exchanger 12.

That is, in the air conditioner 1 of the dehumidifying-heating mode, the heat absorbed from the outside air OA via the low-temperature heat medium circuit 30 is pumped by the heat pump cycle 10 and uses it as a heating source for heating the ventilation air W via the high-temperature heat medium circuit 21.

(d) Sole Battery Cool-Down Mode

The sole battery cool-down mode is an operation mode in which the battery 31 is cooled without air-conditioning in the vehicle interior. In the sole battery cool-down mode, the controller 50 opens the second expansion valve 14b at a predetermined throttle opening degree, and brings the first expansion valve 14a into a fully closed state.

Therefore, in the sole battery cool-down mode of the heat pump cycle 10, a heat pump cycle is configured in which the refrigerant circulates in the order of the compressor 11, the heat medium-refrigerant heat exchanger 12, the second expansion valve 14b, the chiller 16, and the compressor 11.

That is, in the sole battery cool-down mode, the refrigerant is allowed to flow into the chiller 16, so that the heat absorbed from the heat medium of the low-temperature heat medium circuit 30 is pumped up to the high-temperature heat medium of the heating unit 20.

In this cycle configuration, the controller 50 controls operations of various control target devices connected to the output side thereof. For example, the controller 50 controls the operation of the compressor 11 so as to exhibit a refrigerant discharge capacity determined in the sole battery cool-down mode.

In the heating unit 20 of the sole battery cool-down mode, the controller 50 controls the operation of the high-temperature pump 26 so as to exhibit a predetermined water pumping capacity in the sole battery cool-down mode. Further, the controller 50 controls the high-temperature flow adjustment valve 25 so as to cause the radiator 22 and the electric heater 24 to communicate with each other in the flow of the heat medium and to close the flow of the heat medium flowing into the heater core 23.

As a result, in the high-temperature heat medium circuit 21 during the sole battery cool-down mode, a high-temperature heat medium circulates the high-temperature pump 26, the heat medium-refrigerant heat exchanger 12, the electric heater 24, the high-temperature flow adjustment valve 25, the radiator 22, and the high-temperature pump 26 in this order.

In the low-temperature heat-medium circuit 30 during the sole battery cool-down mode, the controller 50 controls the operation of the low-temperature pump 34 so as to exhibit the water pumping capacity in the sole battery cool-down mode. For example, in the low-temperature heat medium circuit 30, the three-way valve 33 can be controlled so that the chiller 16 and the battery 31 communicate with each other while the flow of the low-temperature heat medium flowing in the exterior hear exchanger 32 is closed.

As a result, in the low-temperature heat medium circuit 30 of the sole battery cool-down mode, the low-temperature heat medium circulates in the order of the low-temperature pump 34, the battery 31, the three-way valve 33, the chiller 16, and the low-temperature pump 34.

Here, in the low temperature heat medium circuit 30, the low temperature heat medium cooled by the chiller 16 flows into the battery 31 by the three-way valve 33. In the heat medium passage of the battery 31, the low temperature heat medium cools the battery 31 by absorbing heat from the battery 31. The low-temperature heat medium flowing out of the battery 31 is drain by the low-temperature pump 34 to be pressure-fed to the heat medium passage 16b of the chiller 16.

That is, according to the air conditioner 1 in the sole battery cool-down mode, the heat absorbed when cooling the battery 31 can be absorbed by the chiller 16 from the low-temperature heat medium of the low-temperature heat medium circuit 30 to the low-pressure refrigerant of the heat pump cycle 10.

The air conditioner 1 can pump the heat absorbed by the chiller 16 in the heat pump cycle 10 and dissipate the absorbed heat to the high-temperature heat medium of the high-temperature heat medium circuit 21 by the heat medium-refrigerant heat exchanger 12. Further, the air conditioner 1 can dissipate the heat of the high-temperature heat medium to the outside air OA by the radiator 22.

(e) Battery Cool-Down and Cooling Mode

The battery cool-down and cooling mode is an operation mode in which the ventilation air W is cooled by the interior evaporator 15 and blown into the vehicle interior in parallel with cooling of the battery 31. In the battery cool-down and cooling mode, the controller 50 opens the first expansion valve 14a and the second expansion valve 14b respectively at predetermined throttle opening degrees.

Accordingly, in the heat pump cycle 10 in the battery cool-down and cooling mode, the refrigerant circulates through the compressor 11, the heat medium-refrigerant heat exchanger 12, the first expansion valve 14a, the interior evaporator 15, the evaporation pressure adjusting valve 17, and the compressor 11 in this order. At the same time, the refrigerant circulates in the order of the compressor 11, the heat medium-refrigerant heat exchanger 12, the second expansion valve 14b, the chiller 16, and the compressor 11.

That is, in the heat pump cycle 10 of the battery cool-down and cooling mode, a heat pump cycle is formed in which the interior evaporator 15 and the chiller 16 are connected in parallel with the flow of the refrigerant flowing out of the heat medium-refrigerant heat exchanger 12.

In this cycle configuration, the controller 50 controls operations of various control target devices connected to the output side thereof. For example, the controller 50 controls the operation of the compressor 11 so as to exhibit the refrigerant discharge capacity determined in the battery cool-down and cooling mode.

With respect to the heating unit 20 in the battery cool-down and cooling mode, the controller 50 controls the operation of the high-temperature pump 26 so as to exhibit a water pumping capacity in the battery cool-down and cooling mode. Further, the controller 50 controls the high-temperature flow adjustment valve 25 so as to cause the radiator 22 and the electric heater 24 to communicate with each other in the flow of the heat medium and to close the flow of the heat medium flowing into the heater core 23.

Thus, in the high-temperature heat medium circuit 21 in the battery cool-down and cooling mode, a circulation circuit of the high-temperature heat medium circulating through the high-temperature pump 26, the heat medium-refrigerant heat exchanger 12, the electric heater 24, the high-temperature flow adjustment valve 25, the radiator 22, and the high-temperature pump 26 in this order is formed.

In the low-temperature heat medium circuit 30 of the battery cool-down and cooling mode, the controller 50 controls the operation of the low-temperature pump 34 so as to exhibit the hydraulic pressure feeding capability in the battery cool-down and cooling mode. For example, in the low-temperature heat medium circuit 30, the three-way valve 33 can be controlled so that the chiller 16 and the battery 31 communicate with each other while the flow of the low-temperature heat medium flowing in the exterior hear exchanger 32 is closed.

As a result, in the low-temperature heat medium circuit 30 of the battery cool-down and cooling mode, the low-temperature heat medium circulates in the order of the low-temperature pump 34, the battery 31, the three-way valve 33, the chiller 16, and the low-temperature pump 34.

Therefore, in the low-temperature heat medium circuit 30 of the battery cool-down and cooling mode, the heat medium (e.g., cooling water) cooled by the chiller 16 flows into the battery 31 by the three-way valve 33. In the heat medium passage of the battery 31, the low-temperature heat medium cools the battery 31 by absorbing heat from the battery 31. The low-temperature heat medium flowing out of the battery 31 is drain by the low-temperature pump 34 to be pressure-fed to the heat medium passage 16*b* of the chiller 16.

That is, in the air conditioner 1 of the battery cool-down and cooling mode, the heat can be absorbed while cooling the battery 31, through the chiller 16, from the low-temperature heat medium of the low-temperature heat medium circuit 30 to the low-pressure refrigerant in the heat pump cycle 10.

In the battery cool-down and cooling mode, the low-pressure refrigerant can be evaporated by heat exchange with the ventilation air W to be blown into the vehicle interior, so as to cool the ventilation air W in the interior evaporator 15. Thus, the air conditioner 1 can achieve the cooling of the vehicle interior, in the battery cool-down and cooling mode.

In the battery cool-down and cooling mode, the heat absorbed by the refrigerant while cooling the battery 31 or cooling the ventilation air W is dissipated to the high-temperature heat medium in the heat medium-refrigerant heat exchanger 12. In the high-temperature heat medium circuit 21, the high-temperature heat medium dissipates heat to the outside air OA at the radiator 22. Accordingly, the air conditioner 1 in the battery cool-down and cooling mode can improve comfort by cooling the vehicle interior together with cooling of the battery 31.

(f) Battery Cool-Down and Heating Mode

The battery cool-down and heating mode is an operation mode in which the ventilation air W is heated by the heater core 23 and blown into the vehicle interior, in parallel with the heating of the battery 31. In the battery cool-down and heating mode, the controller 50 opens the second expansion valve 14*b* at a predetermined throttle opening degree, and brings the first expansion valve 14*a* into a fully closed state.

Therefore, in the battery cool-down and heating mode of the heat pump cycle 10, a refrigerant cycle is configured in which the refrigerant circulates in the order of the compressor 11, the heat medium-refrigerant heat exchanger 12, the second expansion valve 14*b*, the chiller 16, and the compressor 11.

That is, in the refrigerant circuit of the battery cool-down and heating mode, the refrigerant is caused to flow into the chiller 16, and the heat absorbed from the low-temperature heat medium of the low-temperature heat medium circuit 30 can be pumped up and used for heating the ventilation air W.

In this cycle configuration, the controller 50 controls operations of various control target devices connected to the output side thereof. For example, the controller 50 controls the operation of the compressor 11 so as to exhibit the refrigerant discharge capacity determined in the battery cool-down and heating mode.

With respect to the heating unit 20 in the battery cool-down and heating mode, the controller 50 controls the operation of the high-temperature pump 26 so as to exhibit a water pumping capacity in the battery cool-down and heating mode. The controller 50 controls the operation of the high-temperature flow adjustment valve 25 so as to adjust a flow ratio between the flow amount of the high-temperature heat medium flowing to the radiator 22 and the flow amount of the high-temperature heat medium flowing to the heater core 23.

Then, the controller 50 controls the operation of the electric heater 24 to adjust the heat generation amount of the electric heater 24.

Thus, in the high-temperature heat medium circuit 21 of the battery cool-down and heating mode, a circulation circuit of the high-temperature heat medium circulating through the high-temperature pump 26, the heat medium-refrigerant heat exchanger 12, the electric heater 24, the high-temperature flow adjustment valve 25, the heater core 23, and the high-temperature pump 26 in this order is formed. At the same time, a circulation circuit of the high-temperature heat medium circulating through the high-temperature pump 26, the heat medium-refrigerant heat exchanger 12, the electric heater 24, the high-temperature flow adjustment valve 25, the radiator 22, and the high-temperature pump 26 in this order is formed.

That is, in the high-temperature heat medium circuit 21 of the battery cool-down and heating mode, a heat medium circuit is configured in which the radiator 22 and the heater core 23 are connected in parallel with the flow of the high-temperature heat medium flowing out of the heat medium-refrigerant heat exchanger 12.

For the low-temperature heat medium circuit 30 in the battery cool-down and heating mode, the controller 50 controls the operation of the low-temperature pump 34 so as to exhibit the hydraulic pressure feeding capability in the battery cool-down and heating mode. The controller 50 controls the operation of the three-way valve 33 so as to adjust a flow ratio between the flow amount of the low-temperature heat medium flowing to the battery 31 and the flow amount of the low-temperature heat medium flowing to the exterior heat exchanger 32.

As a result, in the low-temperature heat medium circuit 30 of the battery cool-down and heating mode, the low-temperature heat medium circulates in the order of the low-temperature pump 34, the battery 31, the three-way valve 33, the chiller 16, and the low-temperature pump 34.

In the air conditioner 1 of the battery cool-down and heating mode, the amount of heat absorbed while cooling the battery 31 in the low-temperature heat medium circuit 30 can be absorbed by the low-pressure refrigerant of the heat pump cycle 10 in the chiller 16.

In the air conditioner 1 of the battery cool-down and heating mode, the heat absorbed from the low-temperature heat medium in the heat pump cycle 10 can be dissipated to the high-temperature heat medium by the heat medium-refrigerant heat exchanger 12.

By controlling the operation of the high-temperature flow adjustment valve 25 in the high-temperature heat medium circuit 21, the heat dissipation amount of the high-temperature heat medium in the heater core 23 and the heat dissipation amount of the high-temperature heat medium in the radiator 22 can be adjusted. In other words, the air conditioner 1 can dissipate the heat of the high-temperature heat medium that is excessive for heating of the ventilation air W, to the outside air OA at the radiator 22.

Further, in the battery cool-down and heating mode, the high-temperature heat medium can be heated by the electric heater 24 in the high-temperature heat medium circuit 21. Therefore, the air conditioner 1 can appropriately heat the ventilation air W by the heater core 23, and can heat the vehicle interior by appropriately adjusting the heat generation amount of the electric heater 24.

(g) Battery Cool-Down and Dehumidifying-Heating Mode

The battery cool-down and dehumidifying-heating mode is an operation mode in which the ventilation air W cooled by the interior evaporator 15 is heated by the heater core 23 and is blown into the vehicle interior in parallel with cooling of the battery 31. In the battery cool-down and dehumidifying-heating mode, the controller 50 opens the first expansion valve 14a and the second expansion valve 14b respectively at predetermined throttle opening degrees.

Therefore, in the heat pump cycle 10 during the battery cool-down and dehumidifying-heating mode, the refrigerant circulates in the order of the compressor 11, the heat medium-refrigerant heat exchanger 12, the first expansion valve 14a, the interior evaporator 15, the evaporation pressure adjusting valve 17, and the compressor 11. At the same time, the refrigerant circulates in the order of the compressor 11, the heat medium-refrigerant heat exchanger 12, the second expansion valve 14b, the chiller 16, and the compressor 11.

That is, in the heat pump cycle 10 during the battery cool-down and dehumidifying-heating mode, the heat pump cycle is configured in which the interior evaporator 15 and the chiller 16 are connected in parallel with respect to the flow of the refrigerant flowing out of the heat medium-refrigerant heat exchanger 12.

In this cycle configuration, the controller 50 controls operations of various control target devices connected to the output side thereof. For example, the controller 50 controls the operation of the compressor 11 so as to exhibit the refrigerant discharge capacity determined in the battery cool-down and dehumidifying-heating mode.

With respect to the heating unit 20 in the battery cool-down and dehumidifying-heating mode, the controller 50 controls the operation of the high-temperature pump 26 so as to exhibit a water pumping capacity in the battery cool-down and dehumidifying-heating mode. The controller 50 controls the operation of the high-temperature flow adjustment valve 25 so as to adjust a flow ratio between the flow amount of the high-temperature heat medium flowing to the radiator 22 and the flow amount of the high-temperature heat medium flowing to the heater core 23, similar to the battery cool-down and heating mode.

Then, the controller 50 controls the operation of the electric heater 24 to adjust the heat generation amount of the electric heater 24.

Thus, in the high-temperature heat medium circuit 21 of the battery cool-down and dehumidifying-heating mode, a circulation circuit of the high-temperature heat medium circulating through the high-temperature pump 26, the heat medium-refrigerant heat exchanger 12, the electric heater 24, the high-temperature flow adjustment valve 25, the heater core 23, and the high-temperature pump 26 in this order is formed. At the same time, a circulation circuit of the high-temperature heat medium circulating through the high-temperature pump 26, the heat medium-refrigerant heat exchanger 12, the electric heater 24, the high-temperature flow adjustment valve 25, the radiator 22, and the high-temperature pump 26 in this order is formed.

That is, in the high-temperature heat medium circuit 21 of the battery cool-down and dehumidifying-heating mode, a heat medium circuit is configured in which the radiator 22 and the heater core 23 are connected in parallel with respect to the flow of the high-temperature heat medium flowing out of the heat medium-refrigerant heat exchanger 12.

For the low-temperature heat medium circuit 30 in the battery cool-down and dehumidifying-heating mode, the controller 50 controls the operation of the low-temperature pump 34 so as to exhibit the hydraulic pressure feeding capability in the battery cool-down and dehumidifying-heating mode. The controller 50 controls the operation of the three-way valve 33 so as to adjust a flow ratio between the flow amount of the low-temperature heat medium flowing to the battery 31 and the flow amount of the low-temperature heat medium flowing to the exterior heat exchanger 32. The control content of the three-way valve 33 in this case will also be described later with reference to the drawings.

As a result, in the low-temperature heat medium circuit 30 of the battery cool-down and dehumidifying-heating mode, the low-temperature heat medium circulates in the order of the low-temperature pump 34, the battery 31, the three-way valve 33, the chiller 16, and the low-temperature pump 34.

In the air conditioner 1 of the battery cool-down and dehumidifying-heating mode, the amount of heat absorbed while cooling the battery 31 and the amount of heat absorbed from the outside air OA at the exterior heat exchanger 32 in the low-temperature heat medium circuit 30 can be absorbed by the low-pressure refrigerant of the heat pump cycle 10 in the chiller 16.

In the air conditioner 1 of the battery cool-down and dehumidifying-heating mode, the heat absorbed from the low-temperature heat medium and the heat absorbed while dehumidifying the ventilation air W in the heat pump cycle 10 can be dissipated to the high-temperature heat medium by the heat medium-refrigerant heat exchanger 12.

By controlling the operation of the high-temperature flow adjustment valve 25 in the high-temperature heat medium circuit 21, the heat dissipation amount of the high-temperature heat medium in the heater core 23 and the heat dissipation amount of the high-temperature heat medium in the radiator 22 can be adjusted. In other words, the air conditioner 1 can dissipate the heat of the high-temperature heat medium, which is excessive for heating of the dehumidified ventilation air W, to the outside air OA at the radiator 22.

Further, in the battery cool-down and dehumidifying-heating mode, the high-temperature heat medium can be heated by the electric heater 24 in the high-temperature heat medium circuit 21. Thus, the air conditioner 1 can appropriately adjust the heat generation amount of the electric heater 24 so as to appropriately heat the dehumidified ventilation air W to dehumidify and heat the vehicle interior.

Next, the contents of the adjustment control of the heat absorption amount of the low-temperature heat medium circuit 30 and the adjustment control of the heat generation amount of the electric heater 24 in the air conditioner 1 according to the first embodiment will be described with reference to FIGS. 4 to 7.

The battery 31 in the air conditioner 1 tends to decrease in output at a low temperature, and tends to deteriorate at a high temperature. Therefore, in order to keep the battery 31 in an appropriate temperature range, it is necessary to circulate the low-temperature heat medium based on the presence or absence of the cooling request of the battery 31.

Figure 4:
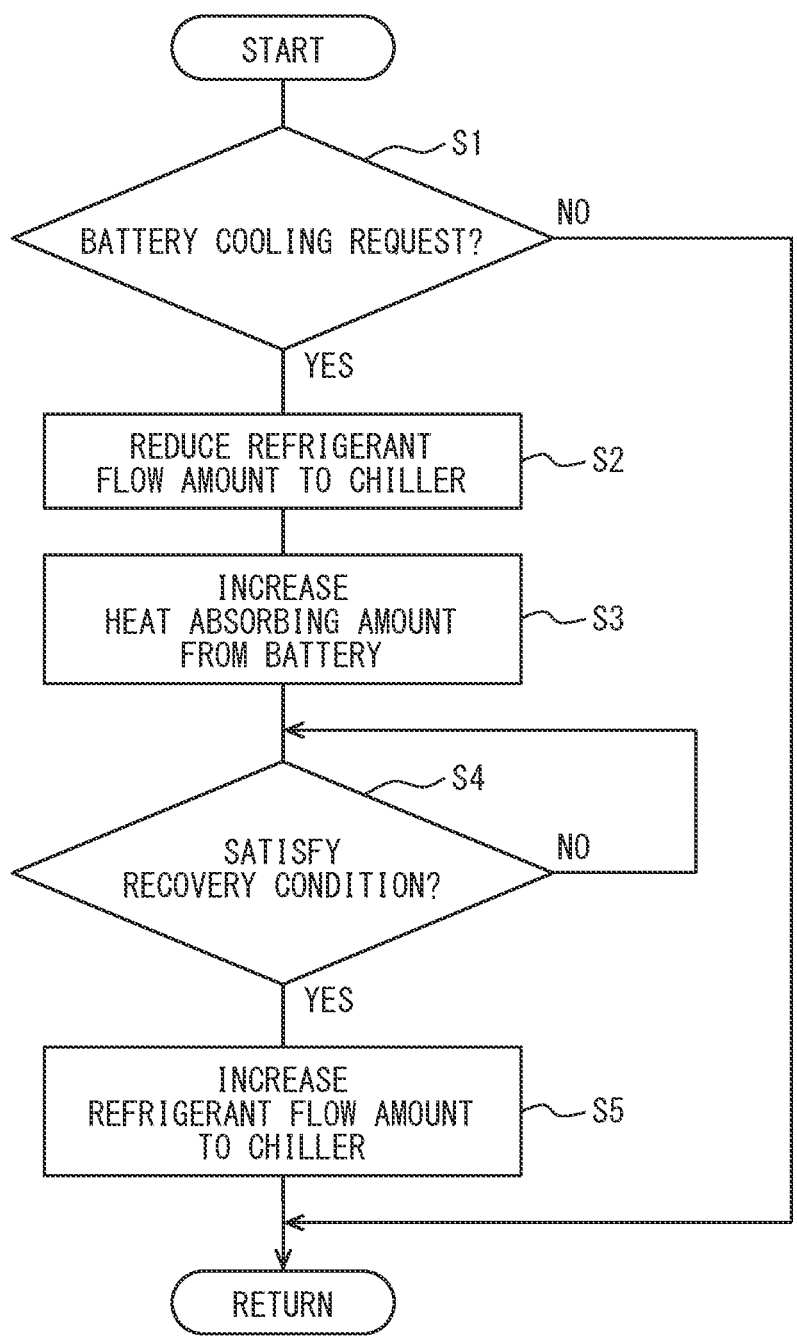
FIG. 4 is a flowchart of a control process relating to adjustment of a heat absorbing amount when a battery cooling request is made in the first embodiment.

FIG. 4 shows the control contents of the adjustment control of the heat absorption amount in the air conditioner 1 when the battery 31 is requested to be cooled. The control program according to FIG. 4 is executed by the controller 50.

At step S1, it is determined whether the cooling request of the battery 31 has been changed from the "none" state to the "yes" state. That is, step S1 determines whether there is a battery cooling request. In the present embodiment, when the battery temperature TBA becomes equal to or higher than a reference battery temperature KTBA, it is determined that the cooling request of the battery 31 is changed from the "none" state to the "yes" state.

If the cooling request of the battery 31 is not detected, that is, if it is determined that the battery temperature TBA is lower than the reference battery temperature KTBA, the control program of FIG. 4 is terminated.

On the other hand, when it is determined that the cooling request of the battery 31 is changed to the "yes" state, that is, the battery temperature TBA is equal to or higher than the reference battery temperature KTBA, the process proceeds to step S2.

At step S2, the flow amount of the refrigerant flowing into the chiller 16 in the heat pump cycle 10 is reduced. Specifically, the flow amount of the refrigerant flowing into the chiller 16 is reduced by reducing the flow ratio of the flow amount of the refrigerant flowing into the chiller 16 to the flow amount of the refrigerant flowing into the interior evaporator 15.

In the air conditioner 1 of the first embodiment, for example, the flow amount of the refrigerant flowing into the chiller 16 is reduced by reducing the rotation speed (that is, the refrigerant discharge capacity) of the compressor 11. Further, for example, the flow amount of the refrigerant flowing into the chiller 16 may be reduced by reducing the throttle opening degree of the second expansion valve 14b.

Next, at step S3, the amount of heat absorbed from the battery 31 is increased, among the plurality of heat absorbing devices such as the battery 31 and the exterior heat exchanger 32. In the present embodiment, the three-way valve 33 can be controlled, so that the chiller 16 and the battery 31 communicate with each other, and the flow of the low-temperature heat medium flowing in the exterior hear exchanger 32 is closed. As a result, the entire amount of the low-temperature heat medium that has passed through the chiller 16 passes through the heat medium passage of the battery 31, so that the amount of heat absorbed from the battery 31 increases.

Here, when the amount of heat absorbed from the battery 31 is increased at step S3, the temperature of the low-temperature heat medium flowing into the chiller 16 rises rapidly. In this state, if the flow amount of the refrigerant flowing into the chiller 16 in the heat pump cycle 10 is immediately recovered (that is, increased), the durability of the compressor 11 may be greatly affected.

With the elapsed time from the start of step S3, the amount of temperature change of the low-temperature heat medium flowing into the chiller 16 decreases. After a predetermined recovery condition is satisfied, the influence on the durability of the compressor 11 becomes small even if the flow amount of the refrigerant flowing into the chiller 16 in the heat pump cycle 10 is increased.

At this time, the amount of temperature change of the low-temperature heat medium flowing into the chiller 16 can be detected by the fourth heat medium temperature sensor 53d arranged at the outlet portion of the heat medium passage 16b of the chiller 16. When the flow amount of the refrigerant flowing into the chiller 16 is reduced, the amount of heat exchange in the chiller 16 is also reduced. In this case, the temperature difference between the temperature of the low-temperature heat medium flowing into the chiller 16 and the temperature of the low-temperature heat medium flowing out of the chiller 16 is also reduced. Therefore, the amount of temperature change of the low-temperature heat medium may be detected by the fourth heat medium temperature sensor 53d.

A step S4, it is determined whether or not the predetermined recovery condition is satisfied. As the recovery condition, for example, a reference elapsed time may be adopted.

Alternatively, for example, when the temperature change amount of the low-temperature heat medium flowing into the chiller 16 becomes equal to or less than a predetermined reference change amount, it may be determined that the recovery condition is satisfied.

Further, for example, when the difference between the temperature of the low-temperature heat medium flowing into the chiller 16 and the battery temperature TBA becomes equal to or less than a predetermined temperature difference, it may be determined that the recovery condition is satisfied. At step S3 described above, the amount of heat absorbed from the battery 31 is increased, in the battery 31 and the exterior heat exchanger 32 Therefore, the battery 31 corresponds to an example of an increased heat absorption device, and the battery temperature TBA corresponds to a temperature of the increased heat absorption device.

If it is determined at step S4 that the recovery condition is not satisfied, the process of step S4 is repeated. On the other hand, when it is determined that the recovery condition is satisfied, the flow amount of the refrigerant flowing to the chiller 16 in the heat pump cycle 10 is increased at step S5. Thereafter, the control program of FIG. 4 is terminated.

In the air conditioner 1 of the first embodiment, for example, the flow amount of the refrigerant flowing into the chiller 16 is increased by increasing the rotation speed (that is, the refrigerant discharge capacity) of the compressor 11. For example, the flow amount of the refrigerant flowing into the chiller 16 may be increased by increasing the throttle opening degree of the second expansion valve 14b.

In the control program according to FIG. 4, when a cooling request is made for the battery 31, and the three-way valve 33 switches the flow passage of the low-temperature heat medium so that the entire amount of the low-temperature heat medium that has passed through the chiller 16 passes through the heat medium flow passage of the battery 31, the number of revolutions of the compressor 11 is reduced. As a result, when the amount of heat absorbed by the low-temperature heat medium in the battery 31 increases and the temperature of the low-temperature heat medium flowing into the chiller 16 rises, the flow amount of the refrigerant flowing into the chiller 16 can be reduced. Therefore, even when the temperature of the low-temperature heat medium flowing into the chiller 16 rises rapidly, it can prevent the high-pressure refrigerant pressure on the discharge side of the compressor 11 from being increased rapidly and the refrigerant temperature discharged from the compressor 11 from being increased rapidly because the rotation speed of the compressor 11 decreases.

Figure 5:
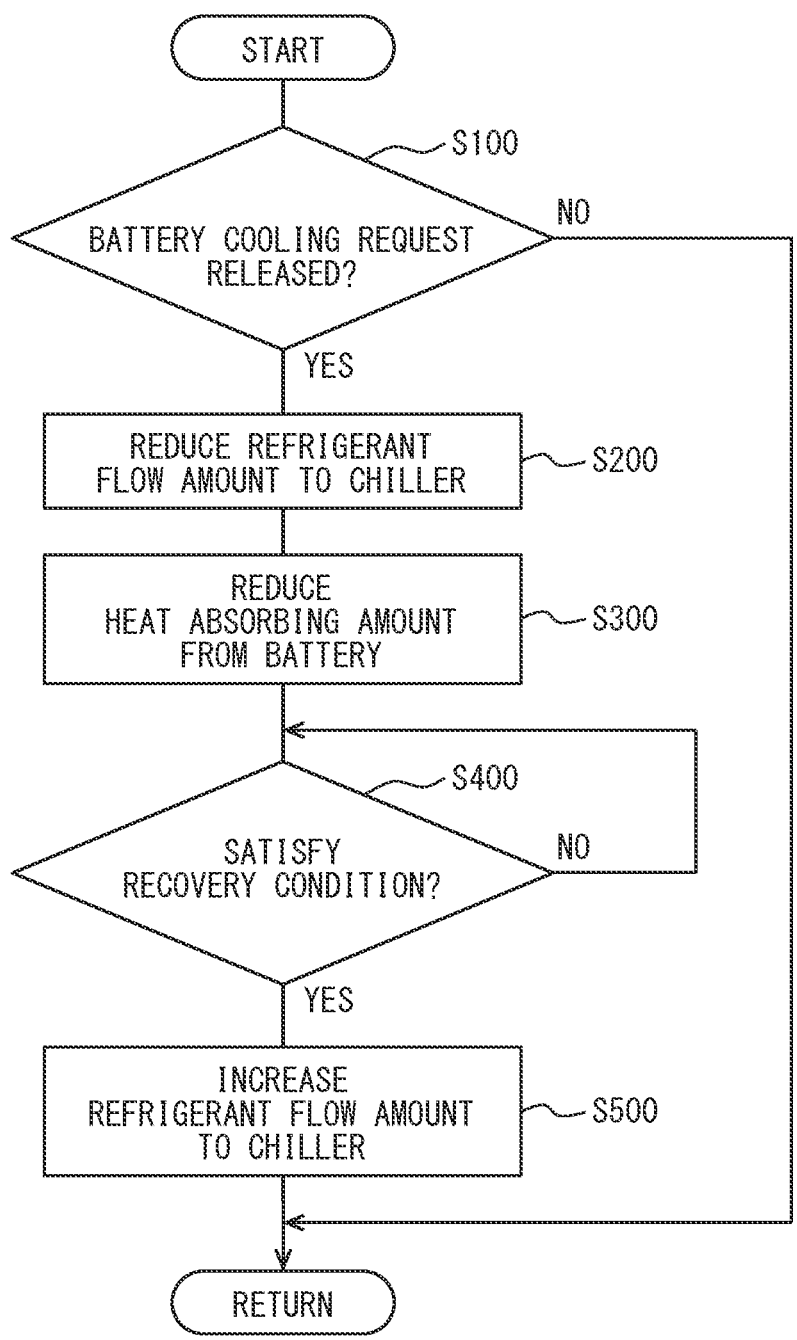
FIG. 5 is a flowchart of a control process relating to adjustment of a heat absorbing amount when a battery cooling request is released in the first embodiment.

FIG. 5 shows the control contents of the adjustment control of the heat absorption amount in the air conditioner 1 when the cooling request of the battery 31 is released. The control program according to FIG. 5 is executed by the controller 50, for example, after the control program of FIG. 4 described above is terminated. That is, after the cooling request of the battery 31 is made and the control program of FIG. 4 described above is executed, the control program of FIG. 5 is executed when the cooling of the battery 31 is terminated, in order to sufficiently cool the battery 31.

At step S100, it is determined whether or not the cooling request of the battery 31 has been changed from the "YES" state to the "NO" state. That is, step S100 determines whether the cooling request of the battery 31 is released. In the present embodiment, when the battery temperature TBA becomes equal to or lower than the reference battery temperature KTBA, it is determined that the cooling request of the battery 31 is released.

If the cooling request release of the battery 31 is not detected, that is, if it is determined that the battery temperature TBA is higher than the reference battery temperature KTBA, the control program of FIG. 5 is terminated. On the other hand, when it is determined that the cooling request of the battery 31 is changed to the "NO" state, that is, the battery temperature TBA is lower than the reference battery temperature KTBA, the process proceeds to step S200.

In step S200, the flow amount of the refrigerant flowing into the chiller 16 in the heat pump cycle 10 is reduced in the same manner as in step S2 described above.

Next, at step S300, the amount of heat absorbed from the battery 31 is reduced, among the plurality of heat absorbing devices such as the battery 31 and the exterior heat exchanger 32. In the present embodiment, the three-way valve 33 can be controlled, so that the chiller 16 and the exterior heat exchanger 32 communicate with each other, and the flow of the low-temperature heat medium flowing in the battery 31 is closed. As a result, the entire amount of the low-temperature heat medium that has passed through the chiller 16 passes through the exterior heat exchanger 32, so that the amount of heat absorbed from the battery 31 reduces.

At the next step S400, similarly to the above-mentioned step S4, it is determined whether or not the predetermined recovery condition is satisfied. If it is determined that the recovery condition is not satisfied, the process of step S400 is repeated.

Alternatively, for example, when the temperature change amount of the low-temperature heat medium flowing into the chiller 16 becomes equal to or less than a predetermined reference change amount, it may be determined that the recovery condition is satisfied at step S400, similarly to step S4.

Alternatively, for example, when the difference between the temperature of the low-temperature heat medium flowing into the chiller 16 and the outside air temperature Tam becomes equal to or less than a predetermined temperature difference, it may be determined that the recovery condition is satisfied. At step S300 described above, among the battery 31 and the exterior heat exchanger 32, the amount of heat absorbed from the battery 31 is reduced to increase the amount of heat absorbed from the outside air in the exterior heat exchanger 32. Therefore, the exterior heat exchanger 32 corresponds to an example of an increased heat absorption device, and the outside air temperature corresponds to a temperature of the increased heat absorption device.

When determining the recovery condition at step S400, the amount of temperature change of the low-temperature heat medium detected by the fourth heat medium temperature sensor 53d arranged at the outlet portion in the heat medium passage 16b of the chiller 16 may be used in the same manner as in step S4.

On the other hand, when it is determined that the recovery condition is satisfied at step S400, the flow amount of the refrigerant flowing into the chiller 16 is increased at step S500, similarly to that at step S5. Thereafter, the control program of FIG. 5 is terminated.

At step S400, similarly to the above-mentioned step S4, it is determined whether or not the predetermined recovery condition is satisfied. If it is determined that the recovery condition is not satisfied, the process of step S400 is repeated.

On the other hand, when it is determined that the recovery condition is satisfied at step S400, the flow amount of the refrigerant flowing into the chiller 16 is increased at step S500, similarly to that at step S5. Thereafter, the control program of FIG. 5 is terminated.

In the control program according to FIG. 5, when the cooling request to the battery 31 is released, and the three-way valve 33 switches the flow passage of the low-temperature heat medium so that the entire amount of the low-temperature heat medium that has passed through the chiller 16 passes through the exterior heat exchanger 32, the number of revolutions of the compressor 11 is reduced. As a result, when the amount of heat absorbed by the low-temperature heat medium in the battery 31 reduces and the temperature of the low-temperature heat medium flowing into the chiller 16 reduces, the flow amount of the refrigerant flowing into the chiller 16 can be reduced. Therefore, even when the temperature of the low-temperature heat medium flowing into the chiller 16 drops sharply, because the rotation speed of the compressor 11 is reduced, it can prevent an occurrence of liquid backing in which the liquid-phase refrigerant flows into the compressor 11.

Here, in the air conditioner 1 of the first embodiment, in step S5 and step S500 described above, the flow amount of the refrigerant flowing into the chiller 16 is increased by increasing the rotation speed of the compressor 11. At this time, the ratio of increase in the rotation speed of the compressor 11 at step S5 is made lower than the ratio of increase in the ration speed of the compressor 11 at step S500.

Specifically, as shown in FIG. 4, when the three-way valve 33 is set to increase the heat absorption amount of the low-temperature heat medium in the battery 31 and to increase the temperature of the low-temperature heat medium flowing into the chiller 16, the rotation speed of the compressor 11 is increased by a first rotation speed increase ratio if the recovery condition is satisfied at step S5. On the other hand, as shown in FIG. 5, when the three-way valve 33 is set to decrease the heat absorption amount of the low-temperature heat medium in the battery 31 and to decrease the temperature of the low-temperature heat medium flowing into the chiller 16, the rotation speed of the compressor 11 is increased by a second rotation speed increase ratio if the recovery condition is satisfied at step S500. Then, in the air conditioner 1 of the first embodiment, the first rotation speed increase ratio is lower than the second rotation speed increase ratio.

Further, at step S5 and step S500 described above, the flow amount of the refrigerant flowing into the chiller 16 may be increased by increasing the throttle opening degree of the second expansion valve 14b. At this time, the ratio of increase in the throttle opening of the second expansion valve 14b at step S5 is larger than the ratio of increase in the throttle opening of the second expansion valve 14b at step S500.

Specifically, as shown in FIG. 4, when the three-way valve 33 is set to increase the heat absorption amount of the low-temperature heat medium in the battery 31 and to increase the temperature of the low-temperature heat medium flowing into the chiller 16, the throttle opening of the second expansion valve 14b is increased by a first opening increase ratio if the recovery condition is satisfied at step S5. As shown in FIG. 5, when the three-way valve 33 is set to decrease the heat absorption amount of the low-temperature heat medium in the battery 31 and to decrease the temperature of the low-temperature heat medium flowing into the chiller 16, the throttle opening of the second expansion valve 14b is increased by a second opening increase ratio if the recovery condition is satisfied at step S500. Then, in the air conditioner 1 of the first embodiment, the first opening increase ratio is larger than the second opening increase ratio.

Here, when the above-mentioned step S2 is executed, the flow amount of the refrigerant flowing into the chiller 16 decreases, and thereby the temperature of the ventilation air W mat decrease in the battery cool-down and heating mode or the battery cool-down and dehumidifying-heating mode.

Therefore, in the air conditioner 1 according to the first embodiment, by controlling the operation of the electric heater 24, the temperature drop of the ventilation air W can be restricted in the battery cool-down and heating mode or the battery cool-down and dehumidifying-heating mode.

Next, the control content of the operation control of the electric heater 24 in the first embodiment will be described with reference to the drawings. The control program shown in FIG. 6 is executed by the controller 50 at the same time when the reduction of the refrigerant flow amount flowing to the chiller 16 is started at step S2 described above.

Figure 6:
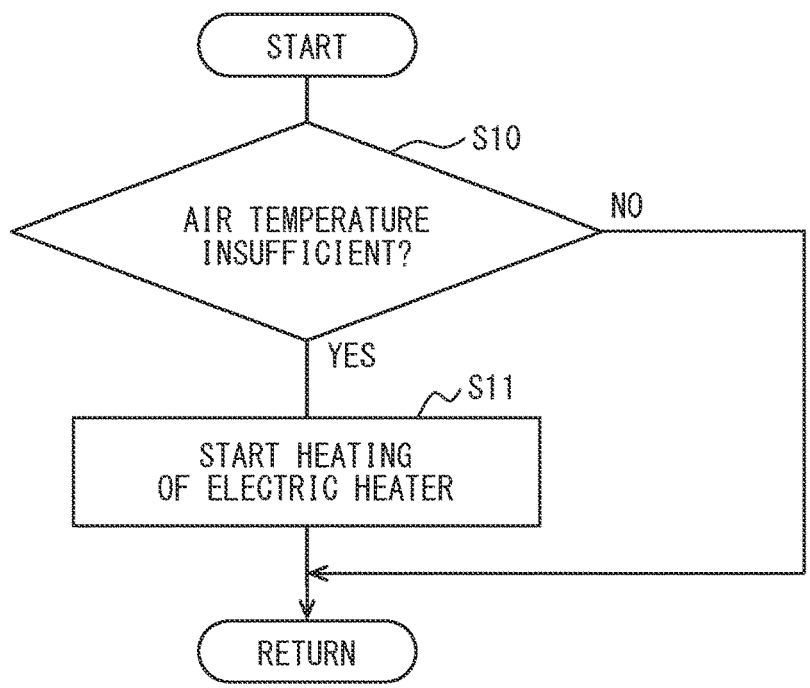
FIG. 6 is a flowchart of a control process relating to adjustment of operation of an electric heater in an air conditioner.

As shown in FIG. 6, at step S10, it is determined whether or not the ventilation air temperature detected by the air temperature sensor 52f is insufficient. Here, a state where the ventilation air temperature is insufficient means a state where the ventilation air temperature is lower than a lower limit value of a predetermined temperature range determined on the basis of a target outlet temperature TAO as a target temperature.

When it is determined that the ventilation air temperature is insufficient, the processing proceeds to step S11. When it is determined that the ventilation air temperature is not insufficient, the control program of FIG. 5 is terminated. Therefore, when the ventilation air temperature is within the temperature range determined on the basis of the target outlet temperature TAO, the control program is terminated.

When the processing proceeds to step S4, since the heat of the high-temperature heat medium is insufficient for the ventilation air temperature to be equal to the target outlet temperature TAO, heating by the electric heater 24 of the high-temperature heat medium circuit 21 is started. Thereafter, the control program of FIG. 5 is terminated.

When the ventilation air temperature is insufficient with respect to the target outlet temperature TAO, the high-temperature heat medium is heated by the electric heater 24 in the high-temperature heat medium circuit 21, so that the insufficient amount of heat can be compensated, thereby making it possible to bring the ventilation air temperature close to the target outlet temperature TAO.

That is, the electric heater 24 can heat the high-temperature heat medium so that the temperature of the ventilation air flowing out from the heater core 23 approaches the target outlet temperature TAO. Therefore, the electric heater 24 corresponds to an example of an auxiliary heating unit.

Next, control content of the adjustment of the heat generation amount of the electric heater 24 in the first embodiment will be described with reference to the drawings. A control program illustrated in FIG. 7 is executed by the controller 50 at the same time as the heating of the high-temperature heat medium by the electric heater 24 is started at step S11 of FIG. 6 described above.

Figure 7:
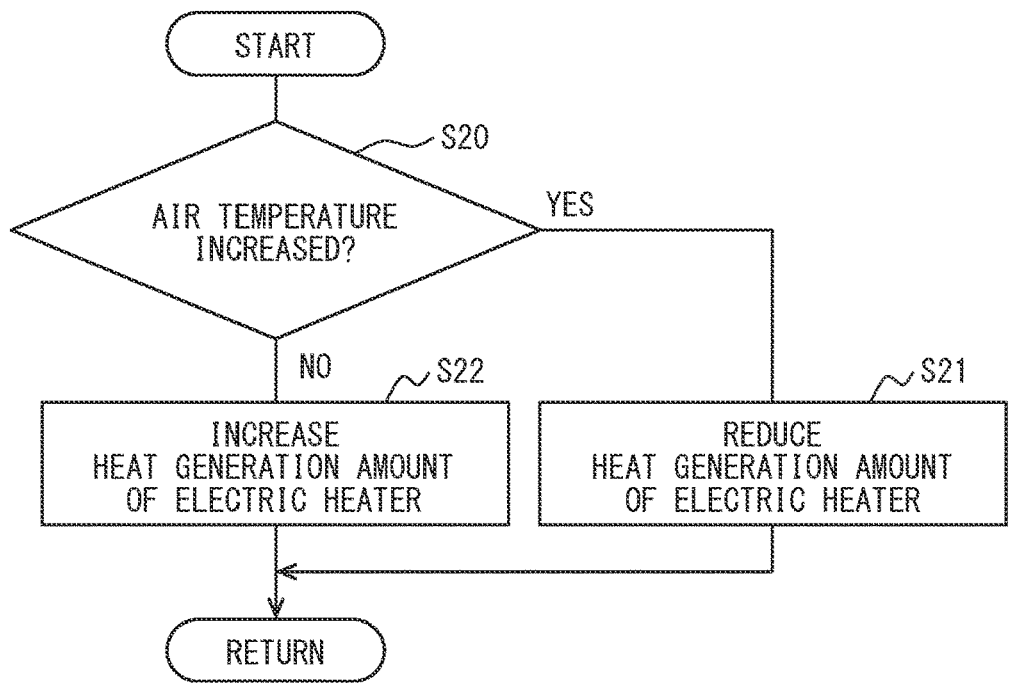
FIG. 7 is a flowchart of a control process relating to adjustment of heat generation amount of an electric heater in the air conditioner.

As illustrated in FIG. 7, at step S20, it is determined whether or not the ventilation air temperature detected by the air temperature sensor 52f has increased. When it is determined that the ventilation air temperature has increased, the processing proceeds to step S21. On the other hand, when it is determined that the ventilation air temperature has not increased, the processing proceeds to step S22.

Step S21 is performed when it is determined that the ventilation air temperature is increased, in a state where the sum of the heat dissipation amount in the heat medium-refrigerant heat exchanger 12 and the heat generation amount of the electric heater 24 is larger than the heat dissipation amount of the heater core 23, and the temperature of the heat medium in the high-temperature heat medium circuit 21 is increased. Therefore, the electric heater 24 is controlled so as to reduce the heat generation amount of the electric heater 24 at step S21. Thus, the sum of the heat dissipation amount in the heat medium-refrigerant heat exchanger 12 and the heat generation amount of the electric heater 24 approaches the heat dissipation amount of the heater core 23. Therefore, by suppressing a temperature rise of the high-temperature heat medium in the high-temperature heat medium circuit 21, a rise in the ventilation air temperature can also be suppressed. Thus, the ventilation air temperature approaches the target outlet temperature TAO. Thereafter, the control program illustrated in FIG. 6 is terminated.

Step S22 is performed when it is determined that the ventilation air temperature is decreased in a state where the temperature of the heat medium in the high-temperature heat medium circuit 21 is decreased since the sum of the heat dissipation amount in the heat medium-refrigerant heat exchanger 12 and the heat generation amount of the electric heater 24 is smaller than the heat dissipation amount of the heater core 23. Therefore, the electric heater 24 is controlled so as to increase the heat generation amount of the electric heater 24. Thus, the sum of the heat dissipation amount in the heat medium-refrigerant heat exchanger 12 and the heat generation amount of the electric heater 24 approaches the heat dissipation amount of the heater core 23. By suppressing a temperature decrease of the high-temperature heat medium in the high-temperature heat medium circuit 21, a decrease in the ventilation air temperature can also be suppressed. Thus, the ventilation air temperature approaches the target outlet temperature TAO. Thereafter, the control program illustrated in FIG. 6 is terminated.

Then, by controlling the operation of the electric heater 24 according to the control program illustrated in FIG. 6, it is possible to compensate for insufficiency by adding the amount of heat insufficient for achieving the target outlet temperature TAO to the high-temperature heat medium including the waste heat accompanying the cooling of the battery 31.

Therefore, in the battery cool-down and heating mode and the battery cool-down and dehumidifying-heating mode, the air conditioner 1 can bring the ventilation air temperature closer to the target outlet temperature TAO even when the flow amount of the refrigerant flowing into the chiller 16 decreases.

As described above, in the air conditioner 1 according to the first embodiment, a plurality of operation modes including the battery cool-down and heating mode and the battery cool-down and dehumidifying-heating mode can be achieved by causing the heat pump cycle 10, the heating unit 20, and the low-temperature heat medium circuit 30 to cooperate with each other.

In the battery cool-down and heating mode and the battery cool-down and dehumidifying-heating mode, the air conditioner 1 can cool the battery 31 via the low-temperature heat medium, and also pump up the waste heat of the battery 31 by the heat pump cycle 10 to use the waste heat for heating the ventilation air W. Thus, the air conditioner 1 can achieve the air conditioning of the air conditioning target space using the waste heat of the battery 31 while cooling the battery 31.

As illustrated in FIG. 1, the heating unit 20 includes the high-temperature heat medium circuit 21, and the high-temperature heat medium circuit 21 is formed by connecting the radiator 22 and the heater core 23 in parallel with the heat medium-refrigerant heat exchanger 12, with respect to the flow of the high-temperature heat medium.

In the air conditioner 1, because the heating unit 20 is configured by the high-temperature heat medium circuit 21 including the radiator 22 and the heater core 23, the heat dissipation amount to the outside air OA in the radiator 22 and the heat dissipation amount to the ventilation air W in the heater core 23 can be adjusted by adjusting the flow amount of the high-temperature heat medium respectively flowing into the radiator 22 and the heater core 23.

Further, the high-temperature flow adjustment valve 25 in the air conditioner 1 continuously adjusts the flow ratio of the flow amount of the high-temperature heat medium flowing into the heater core 23 and the flow amount of the high-temperature heat medium flowing into the radiator 22, in the high-temperature heat medium circuit 21.

Thus, the air conditioner 1 can adjust the heat dissipation amount in the heater core 23 in accordance with adjustment of the heat dissipation amount by the radiator 22, and can ensure the comfort in the vehicle interior with a simpler configuration and with higher accuracy.

As illustrated in FIG. 1, in the heat pump cycle 10 of the air conditioner 1, the first expansion valve 14a and the interior evaporator 15 are connected in parallel with the second expansion valve 14b and the chiller 16, with the flow of the refrigerant.

Therefore, in the air conditioner 1, the ventilation air W blown into the vehicle interior can be cooled by the interior evaporator 15 in parallel with the cooling of the battery 31 using the chiller 16. That is, the air conditioner 1 can further improve the comfort in the vehicle interior at the same time as the cooling of the battery 31.

Further, as shown in FIGS. 4 and 5, in the air conditioner 1, when the three-way valve 33, which is an example of a heat absorption adjusting unit, changes the heat absorption amount of the low-temperature heat medium in each of the battery 31 and the exterior heat exchanger 32, the flow amount of the refrigerant flowing into the chiller 16 is changed. According to this, even when the heat absorption amount of the low temperature heat medium changes and the temperature of the low-temperature heat medium flowing into the chiller 16 suddenly changes, because the flow amount of the refrigerant flowing into the chiller 16 decreases, the influence on the durability of compressor 11 can be reduced. As a result, the durability of the compressor 11 can be improved.

Further, as shown in FIG. 1, the air conditioner 1 is provided with the electric heater 24 in the high-temperature heat medium circuit 21 so as to be capable of heating the high-temperature heat medium with an arbitrary amount of heat in the electric heater 21. As illustrated in FIG. 6, the air conditioner 1 starts to heat the high-temperature heat medium by the electric heater 24 when the ventilation air temperature is insufficient with respect to the target outlet temperature TAO.

When the flow amount of the refrigerant flowing into the chiller 16 is reduced, the amount of heat may be insufficient to set the ventilation air temperature to the target outlet temperature TAO in the air conditioner 1. Even in this case, it is possible to compensate the insufficient heat amount due to heating by the electric heater 24. Therefore, it is possible to ensure the comfort in the vehicle interior while improving the durability of the compressor 11.

Further, as shown in FIG. 7, the air conditioner 1 adjusts the heat generation amount of the electric heater 24 so that the ventilation air temperature approaches the target outlet temperature TAO.

Therefore, the air conditioner 1 can adjust the amount of heat of the high-temperature heat medium by adjusting the heat generation amount of the electric heater 24, and consequently can adjust the amount of heat dissipated to the ventilation air W by the heater core 23.

That is, the air conditioner 1 can improve the comfort of the air conditioning target space regardless of the reduce of the refrigerant flow amount flowing into the chiller 16, when the air-conditioning of the air conditioning target space is performed using the waste heat of the battery 31 in the battery cool-down and heating mode and the battery cool-down and dehumidifying-heating mode.

Second Embodiment

A second embodiment of the present disclosure will be described below with reference to FIG. 8. In the second embodiment, a low-temperature flow adjustment valve 33a is adopted instead of the three-way valve 33 as a flow adjusting unit and a heat absorption adjusting unit of the low-temperature heat medium circuit 30.

Figure 8:
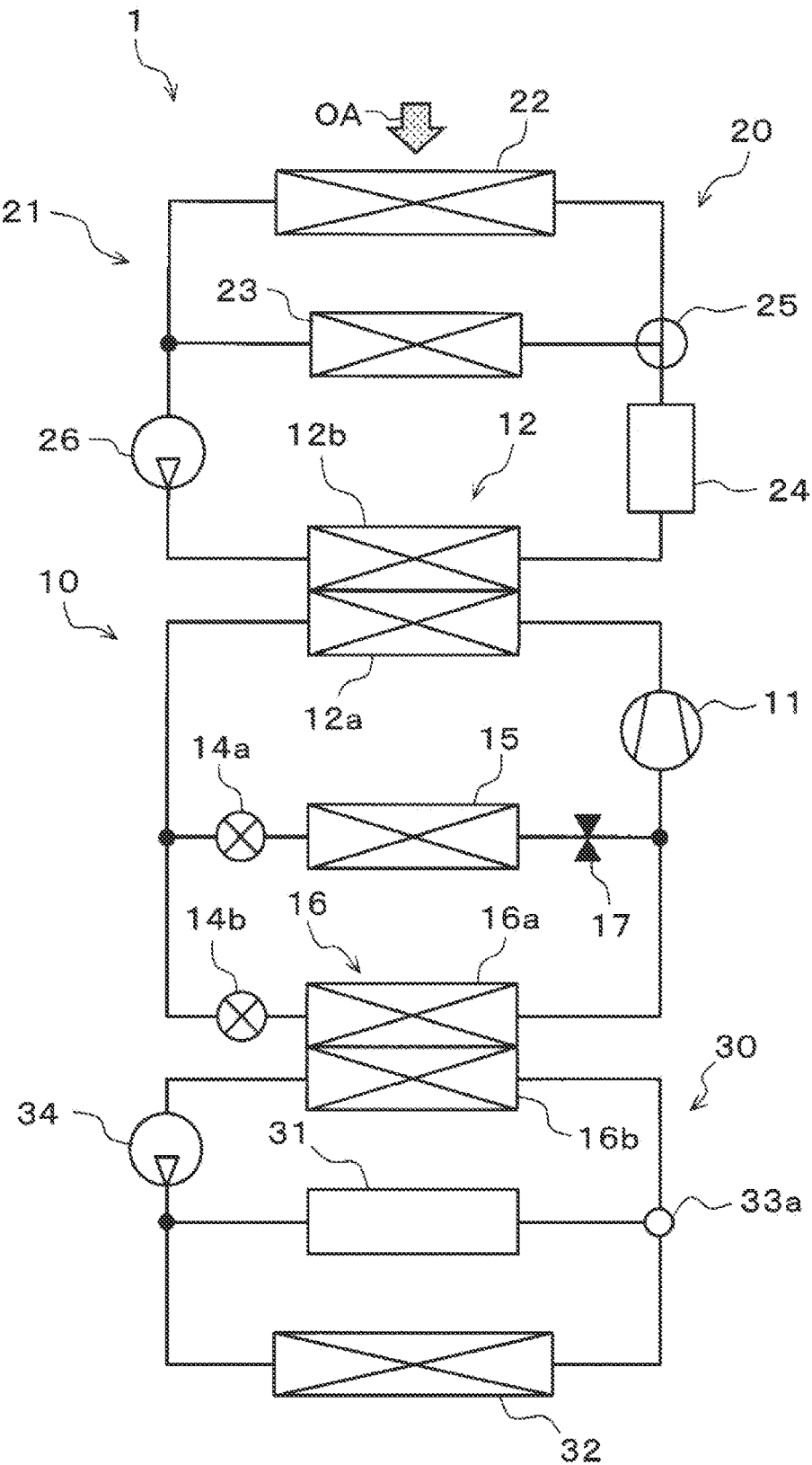
FIG. 8 is an overall configuration diagram of an air conditioner according to a second embodiment.

As illustrated in FIG. 8, the low-temperature flow adjustment valve 33a is connected to an outlet side of the heat medium passage of the battery 31 and an outlet side of the exterior heat exchanger 32. The low-temperature flow adjustment valve 33a is configured by an electric three-way flow regulation valve having three inflow and outflow ports.

That is, the outlet side of the heat medium passage of the battery 31 is connected to one of the inflow and outflow ports of the low-temperature flow adjustment valve 33a, and the heat medium outlet side of the exterior heat exchanger 32 is connected to another one of the inflow and outflow ports of the low-temperature flow adjustment valve 33a. An inflow port of the heat medium passage 16b in the chiller 16 is connected to the other one of the inflow and outflow ports of the low-temperature flow adjustment valve 33a.

Therefore, the low-temperature heat medium circuit 30 can switch the flow of the low-temperature heat medium in the low-temperature heat medium circuit 30 by controlling the operation of the low-temperature flow adjustment valve 33a. For example, the low-temperature flow adjustment valve 33a can continuously adjust a flow ratio between the flow amount of the low-temperature heat medium passing through the exterior heat exchanger 32 and the flow amount of the low-temperature heat medium passing through the heat medium passage of the battery 31, with respect to the flow of the low-temperature heat medium passing through the heat medium passage 16b of the chiller 16.

For example, in the low-temperature heat medium circuit 30, the low-temperature flow adjustment valve 33a can be controlled, such that the chiller 16 communicates with the battery 31 in the flow of the low-temperature heat medium, and the heat medium flowing to the exterior heat exchanger 32 is closed. In this case, the flow of the low-temperature heat medium is switched so that the entire amount of the low-temperature heat medium that has passed through the chiller 16 flows through the heat medium passage of the battery 31.

Alternatively, in the low-temperature heat medium circuit 30, the low-temperature flow adjustment valve 33a can be controlled, such that the chiller 16 communicates with the exterior heat exchanger 32 in the flow of the low-temperature heat medium, and the heat medium flowing to the battery 31 is closed. In this case, the flow of the low-temperature heat medium is switched so that the entire amount of the low-temperature heat medium that has passed through the chiller 16 flows through the exterior heat exchanger 32.

As described above, according to the air conditioner 1 of the second embodiment, the flow ratio of the low-temperature heat medium flowing between the battery 31 side and the exterior heat exchanger 32 side can be adjusted by the low-temperature flow adjustment valve 33a. Thus, it is possible to absorb heat as much as possible from the low-temperature heat medium to the low-pressure refrigerant while maintaining the cooling capacity of the battery 31.

Third Embodiment

A third embodiment of the present disclosure will be described below with reference to FIG. 9. In the third embodiment, a first low-temperature pump 35a and a second low-temperature pump 35b are adopted instead of the three-way valve 33, as a flow adjusting unit and a heat absorption adjusting unit of the low-temperature heat medium circuit 30.

In the third embodiment, the low-temperature pump 34 in the above-described embodiment is disused, in accordance with the use of the first low-temperature pump 35a and the second low-temperature pump 35b.

Figure 9:
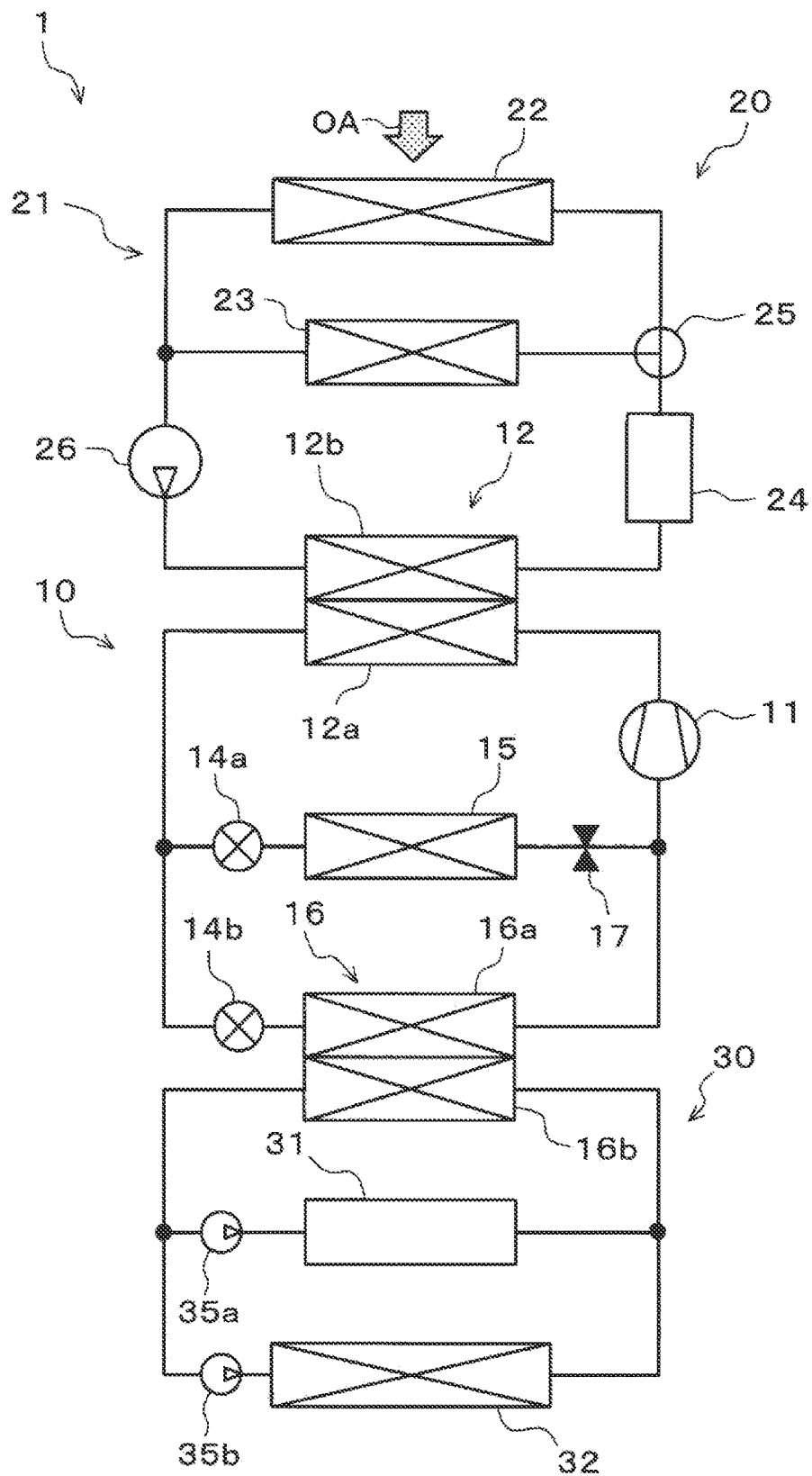
FIG. 9 is an overall configuration diagram of an air conditioner according to a third embodiment.

As shown in FIG. 9, in the low-temperature heat medium circuit 30 according to the third embodiment, a heat medium joining portion of the three-way joint structure is arranged at the arrangement position of the three-way valve 33 of the first embodiment. The outlet side of the heat medium joining portion is connected to the inlet side of the heat medium passage 16b of the chiller 16.

The first low-temperature pump 35a is arranged between one of the outflow ports in the heat-medium branch portion and the inflow port of the heat medium passage of the battery 31. The first low-temperature pump 35a is a heat medium pump that pressure-sends the low-temperature heat medium to the heat medium passage of the battery 31. The basic configuration of the first low-temperature pump 35a is the same as that of the low-temperature pump 34 described above.

Further, the second low-temperature pump 35b is arranged between the other one of the outflow ports of the heat-medium branch portion and the inflow port of the exterior heat exchanger 32. The second low-temperature pump 35b is a heat medium pump that pressure-sends the low-temperature heat medium to the exterior heat exchanger 32. The basic configuration of the second low-temperature pump 35b is the same as that of the low-temperature pump 34 described above.

Therefore, according to the air conditioner 1 of the third embodiment, the pumping capacities (i.e., pressure-sending capacities) of the low-temperature heat medium in the first low-temperature pump 35a and the second low-temperature pump 35b can be adjusted, respectively. Thereby, in the third embodiment, the flow ratio of the flow amount of the low-temperature heat medium flowing to the battery 31 and the flow amount of the low-temperature heat medium flowing to the exterior heat exchanger 32 can be controlled by respectively controlling the operation of the first low-temperature pump 35a and the operation of the second low-temperature pump 35b.

That is, by controlling the operation of the first low-temperature pump 35a and the operation of the second low-temperature pump 35b, the amount of heat absorbed by the low-temperature heat medium in each of the battery 31 and the exterior heat exchanger 32 can be changed and adjusted. In the present embodiment, the first low-temperature pump 35a and the second low-temperature pump 35b correspond to an example of the heat absorption adjusting unit. In the present embodiment, the first low-temperature pump 35a and the second low-temperature pump 35b also correspond to an example of the flow adjusting unit.

As described above, in the air conditioner 1 according to the third embodiment, even in a case where the heat absorption adjusting unit is formed by the first low-temperature pump 35a and the second low-temperature pump 35b, it is possible to obtain the operation and effect exhibited from the configuration and operation common to the above-described embodiment, as in the above-described embodiments.

Fourth Embodiment

A fourth embodiment of the present disclosure will be described below with reference to FIG. 10. In the fourth embodiment, in addition to the battery 31 and the exterior heat exchanger 32, an inverter 36 for traveling the vehicle is adopted as the heat absorption device. In the fourth embodiment, a four-way valve 37 is adopted instead of the three-way valve 33 as the flow adjusting unit and the heat absorption adjusting unit of the low-temperature heat medium circuit 30.

Figure 10:
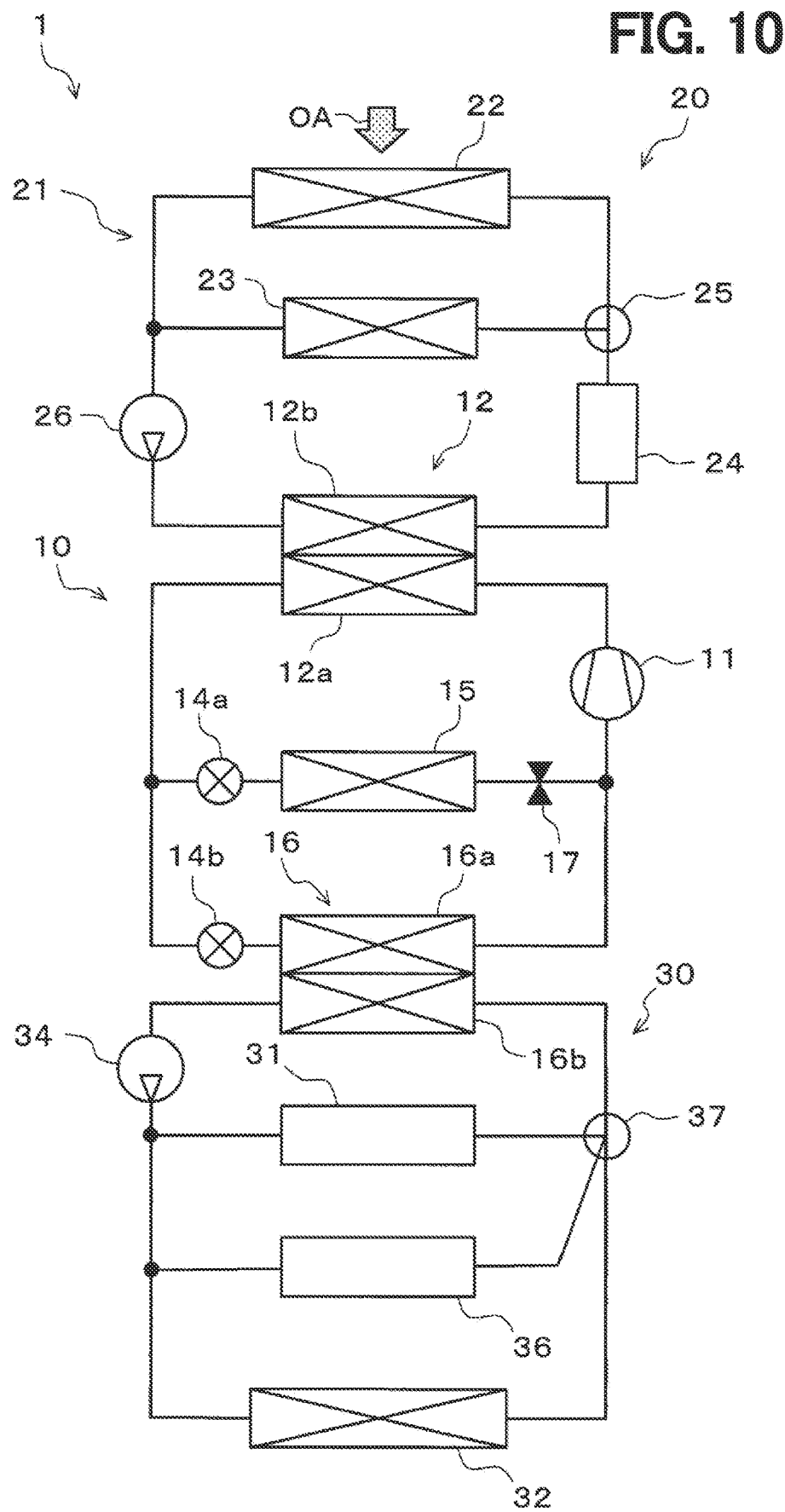
FIG. 10 is an overall configuration diagram of an air conditioner according to a fourth embodiment.

As shown in FIG. 10, in the low-temperature heat medium circuit 30 according to the fourth embodiment, a first branch portion of a three-way joint structure is connected to the discharge side of the low-temperature pump 34. In the first branch portion, one of three inflow and outflow ports in the three-way joint structure is an inflow port, and the remaining two are outflow ports. Therefore, the first branch portion can branch the flow of the low-temperature heat medium pressure-fed from the low-temperature pump 34 into two streams.

The inlet side of the heat medium passage in the battery 31 is connected to one outflow port of the first branch portion of the low-temperature heat medium circuit 30. The second branch portion of the three-way joint structure is connected to the other outflow port of the first branch portion of the low-temperature heat medium circuit 30.

In the second branch portion, one of the three inflow and outflow ports in the three-way joint structure is an inflow port, and the remaining two are outflow ports. Therefore, the second branch portion can further branch the flow of the low-temperature heat medium pressure-fed from the low-temperature pump 34 into two streams.

The inlet side of the heat medium passage of an inverter 36 is connected to one outflow port of the second branch portion of the low-temperature heat medium circuit 30. The inverter 36 is a power conversion unit that converts a direct current into an alternating current. Since the inverter 36 generates heat during power conversion, the inverter 36 corresponds to an example of a heat generator that generates heat during operation.

In the air conditioner 1 of the fourth embodiment, the low-temperature heat medium passes through the heat medium passage of the inverter 36 to exchange heat, so that the heat generated in the inverter 36 can be absorbed by the low-temperature heat medium to adjust the temperature of the inverter 36. That is, the inverter 36 is connected to be cooled by the low-temperature heat medium in the low-temperature heat medium circuit 30, and the temperature of the inverter 36 can be maintained within a predetermined temperature range.

The inlet side of the exterior heat exchanger 32 is connected to the other outflow port at the second branch portion of the low-temperature heat medium circuit 30.

The four-way valve 37 is connected to the outlet side of the heat medium passage of the battery 31, the outlet side of the heat medium passage of the inverter 36, and the outlet side of the exterior heat exchanger 32. The four-way valve 37 is made of an electric four-way flow adjustment valve having four inflow-outflow ports.

That is, the outlet side of the heat medium passage of the battery 31 is connected to one of the inflow and outflow ports of the four-way valve 37, and the outlet side of the heat medium passage of the inverter 36 is connected to another one of the inflow and outflow ports of the four-way valve 37. Further, the outlet side of the exterior heat exchanger 32 is connected to another one of the inflow and outflow ports of the four-way valve 37. An inflow port of the heat medium passage 16b in the chiller 16 is connected to the other one of the inflow and outflow ports of the four-way valve 37.

Therefore, the low-temperature heat medium circuit 30 can switch the flow of the low-temperature heat medium in the low-temperature heat medium circuit 30 by controlling the operation of the four-way valve 37. For example, the four-way valve 37 can continuously adjust a flow ratio among the flow amount of the low-temperature heat medium passing through the exterior heat exchanger 32, the flow amount of the low-temperature heat medium passing through the heat medium passage of the battery 31 and the flow amount of the low-temperature heat medium passing through the heat medium passage of the inverter 36, with respect to the flow of the low-temperature heat medium passing through the heat medium passage 16b of the chiller 16.

For example, in the low-temperature heat medium circuit 30, the four-way valve 37 can be controlled, such that the chiller 16 communicates with the inverter 36 in the flow of the low-temperature heat medium, while a flow of the heat medium flowing to the exterior heat exchanger 32 and a flow of the heat medium flowing to the battery 31 are closed. In this case, the flow of the low-temperature heat medium is switched so that the entire amount of the low-temperature heat medium that has passed through the chiller 16 flows through the heat medium passage of the inverter 36.

According to this aspect, the low-temperature heat medium cooled by the chiller 16 can be supplied to the inverter 36, and thus the inverter 36 can be cooled. In other words, the waste heat of the inverter 36 absorbed along with cooling of the inverter 36 can be absorbed by the low-pressure refrigerant in the heat pump cycle 10 through heat exchange in the chiller 16.

Further, in the air conditioner 1 according to the fourth embodiment, when a difference between the temperature of the low-temperature heat medium flowing into the chiller 16 and an inverter temperature TINV is equal to or less than a predetermined temperature difference, it may be determined that the recovery condition is satisfied at step S4 or step S400 of the control program described above. In this case, the inverter 36 corresponds to an example of an increased heat absorption device.

As described above, in the low-temperature heat medium circuit 30 according to the fourth embodiment, the flow amount of the low-temperature heat medium flowing to the battery 31, the flow amount of the low-temperature heat medium flowing to the inverter 36, and the flow amount of the low-temperature heat medium flowing to the exterior heat exchanger 32 can be adjusted by the four-way valve 37. That is, by controlling the operation of the four-way valve 37, the amount of heat absorbed by the low-temperature heat medium in each of the battery 31, the inverter 36 and the exterior heat exchanger 32 can be changed and adjusted.

That is, the battery 31, the inverter 36 and the exterior heat exchanger 32 correspond to an example of a heat absorption device, and the three-way valve 33 corresponds to an example of a heat absorption adjusting unit. Further, the four-way valve 37 corresponds to an example of a flow amount adjusting unit that adjusts the flow amount of the low-temperature heat medium flowing into the battery 31, the inverter 36, and the exterior heat exchanger 32.

As described above, in the air conditioner 1 according to the fourth embodiment, the battery 31, the inverter 36, and the exterior heat exchanger 32 are adopted as the heat absorption devices, and the heat absorption adjusting unit is made of the four-way valve 37. Even in this case, the effects produced from the same configuration and operation as those in the above-described embodiment can be obtained in the same manner as in the above-described embodiments.

Fifth Embodiment

A fifth embodiment of the present disclosure will be described below with reference to FIG. 11. In the fifth embodiment, a cooler core 38 is adopted as the heat absorption device instead of the inverter 36 of the above-described fourth embodiment.

Figure 11:
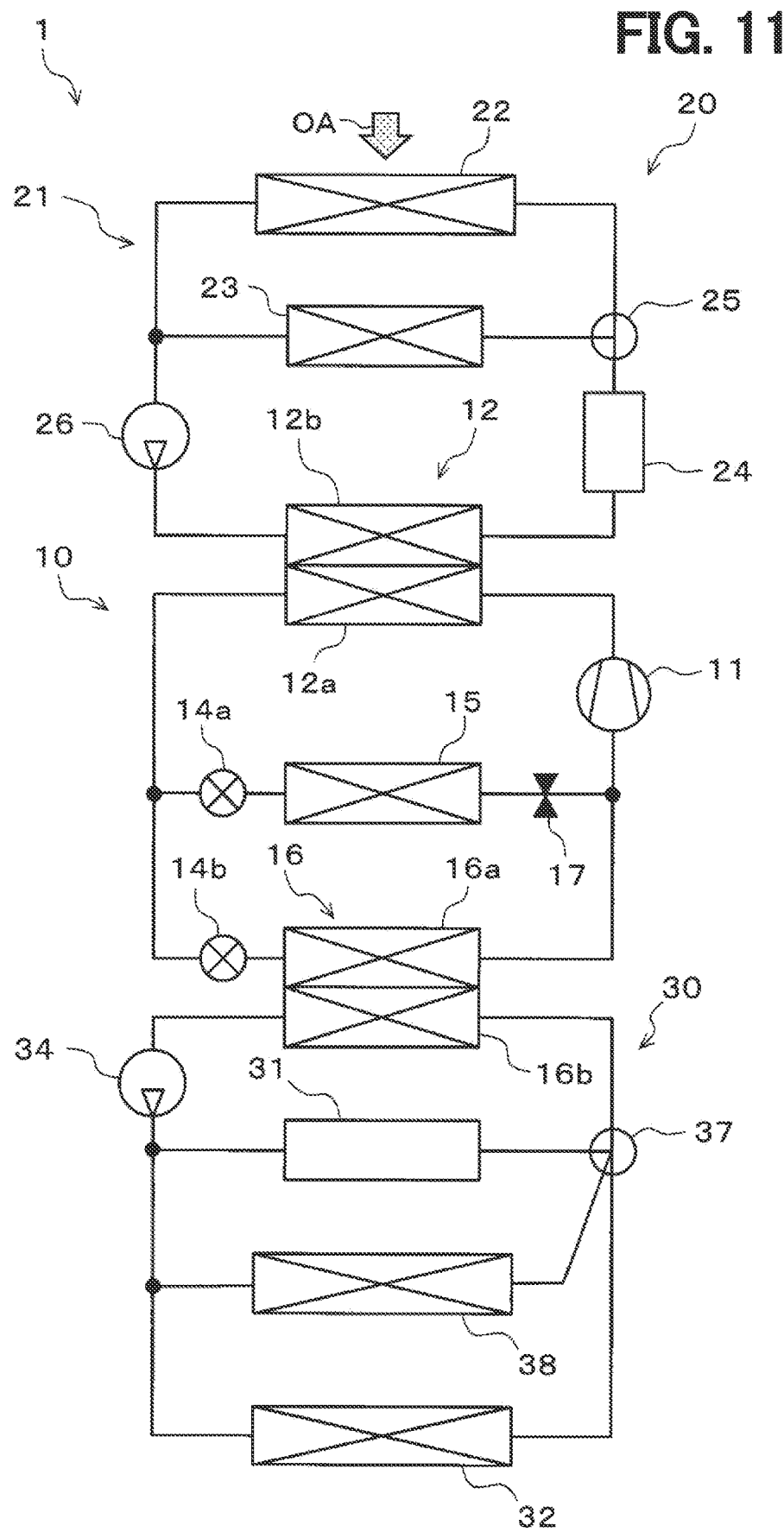
FIG. 11 is an overall configuration diagram of an air conditioner according to a fifth embodiment.

As shown in FIG. 11, in the low-temperature heat medium circuit 30 of the fifth embodiment, the cooler core 38 is arranged at the position of the inverter 36 of the fourth embodiment. The cooler core 38 is a heat exchanger that cools the ventilation air W by exchanging heat between the low-temperature heat medium cooled by the chiller 16 and the ventilation air W. The cooler core 38 is arranged in the casing 41 of the interior air-conditioning unit 40.

In the low-temperature heat medium circuit 30 according to the fifth embodiment, the flow amount of the low-temperature heat medium flowing to the battery 31, the flow amount of the low-temperature heat medium flowing to the cooler core 38, and the flow amount of the low-temperature heat medium flowing to the exterior heat exchanger 32 can be adjusted by the four-way valve 37. That is, by controlling the operation of the four-way valve 37, the amount of heat absorbed by the low-temperature heat medium in each of the battery 31, the cooler core 38 and the exterior heat exchanger 32 can be changed and adjusted. In this embodiment, the battery 31, the cooler core 38, and the exterior heat exchanger 32 correspond to an example of a heat absorption device.

As described above, in the air conditioner 1 according to the fifth embodiment, even in a case where the battery 31, the cooler core 38 and the exterior heat exchanger 32 are adopted as the heat absorption unit, it is possible to obtain the operation and effect exhibited from the configuration and operation common to the above-described embodiment, as in the above-described embodiments.

Sixth Embodiment

Next, a sixth embodiment of the present disclosure will be described with reference to FIG. 12. The sixth embodiment is different from the first embodiment in configuration of the heating unit 20.

Figure 12:
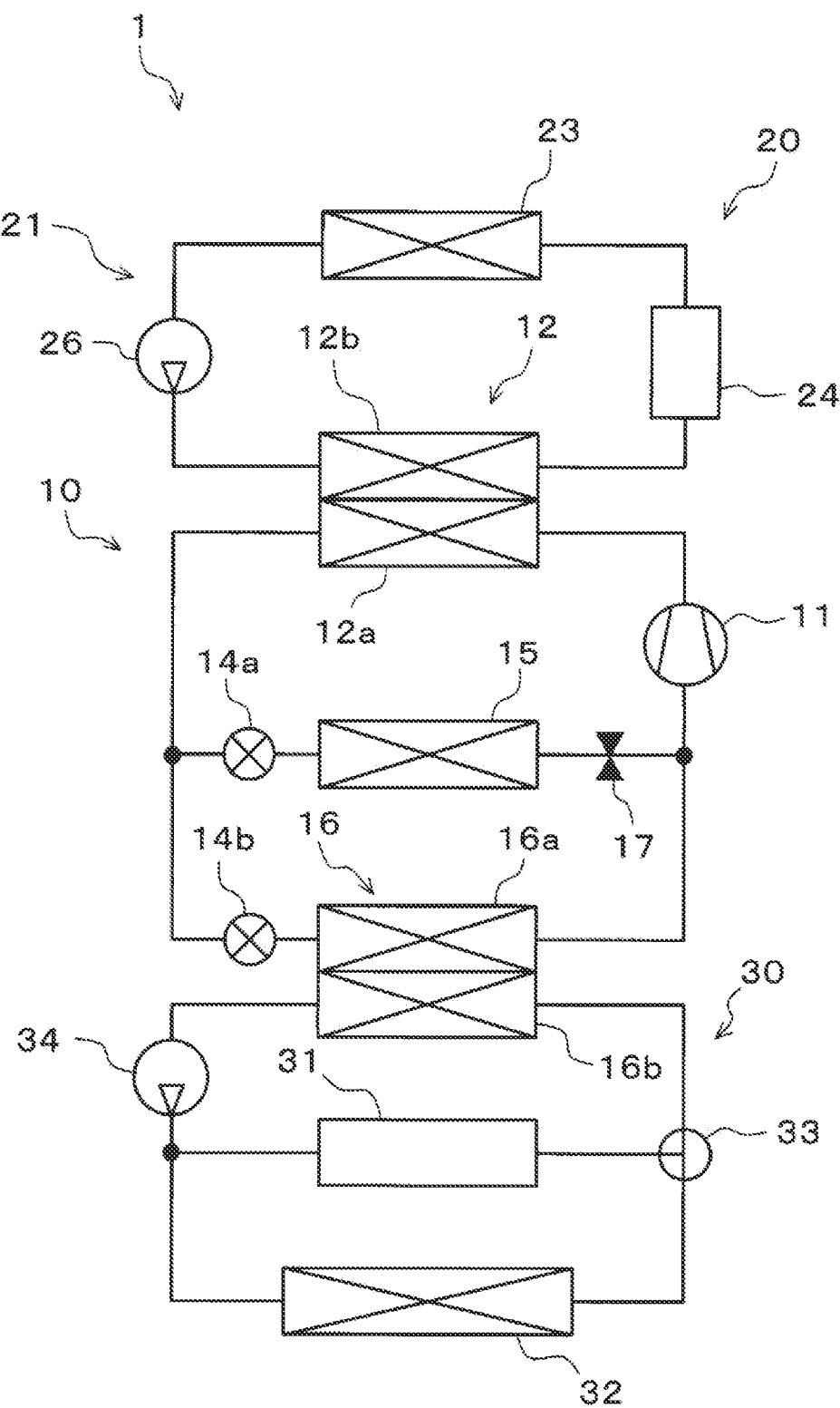
FIG. 12 is an overall configuration diagram of an air conditioner according to a sixth embodiment.

As shown in FIG. 12, the air conditioner 1 according to the sixth embodiment includes a heat pump cycle 10, a heating unit 20, a low-temperature heat medium circuit 30, an interior air-conditioning unit 40, and a controller 50 as in the above-described embodiment.

The heat pump cycle 10 according to the sixth embodiment includes a compressor 11, a heat medium-refrigerant heat exchanger 12, a first expansion valve 14a, a second expansion valve 14b, an interior evaporator 15, a chiller 16, and an evaporation pressure adjusting valve 17 as in the first embodiment.

The heating unit 20 according to the sixth embodiment is formed by a high-temperature heat medium circuit 21 through which the high-temperature heat medium circulates as in the first embodiment. As illustrated in FIG. 12, the high-temperature heat medium circuit 21 includes a heat medium passage 12b of the heat medium-refrigerant heat exchanger 12, a heater core 23, an electric heater 24, and a high-temperature pump 26. That is, the heating unit 20 according to the sixth embodiment is different from the heating unit 20 in the above-described embodiment, in which the radiator 22 and the high-temperature flow adjustment valve 25 are not provided.

The low-temperature heat medium circuit 30 according to the sixth embodiment includes a battery 31, an exterior heat exchanger 32, a low-temperature flow adjustment valve 33, and a low-temperature pump 34 as in the first embodiment.

Therefore, in the air conditioner 1 according to the sixth embodiment, it is possible to realize the adjustment control of the heat absorption amount in the low-temperature heat medium circuit 30 shown in FIGS. 4 and 5 and to realize the adjustment control of the heat generation amount of the electric heater 24 in the high-temperature heat medium circuit 21 shown in FIGS. 6 and 7.

As described above, according to the air conditioner 1 of the sixth embodiment, even when the radiator 22 and the high-temperature flow adjustment valve 25 are not provided, the configuration and operation common to those of the above-described embodiments can be achieved as in the above-described embodiments.

The present disclosure is not limited to the embodiments described above, and various modifications can be made as follows within a range not departing from the spirit of the present disclosure.

(1) The above-described embodiments employ a configuration in which, as the heat pump cycle 10, the first expansion valve 14a and the interior evaporator 15, and the second expansion valve 14b and the chiller 16 are connected in parallel, but the present disclosure is not limited to this configuration.

The heat pump cycle 10 in the present disclosure is only required to include at least a decompression unit and an evaporator (for example, the second expansion valve 14b and the chiller 16) for absorbing heat from the low-temperature heat medium circuit 30, and other configurations can be appropriately changed.

For example, a configuration may be employed in which the first expansion valve 14a and the interior evaporator 15 are removed from the configuration of the heat pump cycle 10 of the above-described embodiments, or a configuration may be employed in which a heat absorption device different from the interior evaporator 15 and the chiller 16 may be connected in parallel with these components. In the heat pump cycle 10, the interior evaporator 15 and the chiller 16 may be connected in series.

(2) In the above-described embodiments, electric expansion valves are employed as the first expansion valve 14a and the second expansion valve 14b, but the present disclosure is not limited to this configuration. Various structures can be employed as long as the high-pressure refrigerant can be decompressed in the heat pump cycle 10. For example, the first expansion valve 14a may be changed to a thermal expansion valve while the second expansion valve 14b is the electric expansion valve.

(3) Although the heat medium-refrigerant heat exchanger 12 is employed as the condenser in the present disclosure, the present disclosure is not limited to the above-described configuration. Specifically, as the condenser in the present disclosure, it is also possible to employ a sub-cool type condenser having a heat exchange unit, a receiver unit, and a subcooling unit.

(4) In the embodiment described above, an excess, insufficiency, and the like with respect to the target outlet temperature TAO are determined using the ventilation air temperature detected by the air temperature sensor 52f, but the present disclosure is not limited to this manner. Determination processing similar to that of the above-described embodiment can be performed as long as it is a physical quantity having a correlation with the temperature of the air supplied to the air-conditioning target space.

For example, the temperature of the high-temperature heat medium may be adopted instead of the detected air temperature. Specifically, in the high-temperature heat medium circuit 21, the temperature of the high-temperature heat medium between the outlet side of the heat medium passage 12b of the heat medium-refrigerant heat exchanger 12 and the inlet side of the heater core 23 may be preferably adopted for the determination instead of the detected air temperature. Further, in the high-temperature heat medium circuit 21, it is more desirable to adopt the temperature of the high-temperature heat medium between the outlet side of the electric heater 24 and the inlet side of the heater core 23 for the determination instead of the detected air temperature.

It may be possible to adopt a physical quantity on the high-pressure side refrigerant in the heat pump cycle 10 for the determination instead of the detected air temperature. Specifically, a high-pressure side refrigerant temperature or a saturated refrigerant temperature in the heat pump cycle 10 may be adopted for the determination instead of the detected air temperature.

(5) Further, in the above-described embodiments, the battery temperature TBA detected by the battery temperature sensor 52g is used to determine whether or not there is a cooling request of the battery 31, but the present disclosure is not limited to this. For example, a battery control unit (ECU), which is a controller for controlling the operation of the battery 31, may be adopted to determine a battery cooling request.

It is also possible to adopt the heat generation amount of the battery 31. Specifically, it may be determined that the cooling request of the battery 31 is changed from the "none" state to the "yes" state when the heat generation amount of the battery 31 estimated by the controller 50 exceeds a predetermined value. The controller 50 may estimate the amount of heat generated by the battery 31 based on a current value of the battery 31, a temperature distribution of the battery 31, a load of a traveling electric motor, or the like. Further, when it is assumed that the temperature or the amount of heat generated by the battery 31 suddenly rises by a look-ahead control, it may be determined that the cooling request of the battery 31 has been changed from the "none" state to the "yes" state.

(6) Further, in the above-described embodiment, at step S4 or step S400, it is determined whether or not the recovery condition is satisfied based on the temperature change amount of the low-temperature heat medium, detected by the fourth heat medium temperature sensor 53*d* arranged at the outlet portion of the heat medium passage 16*b* of the chiller 16, but the present disclosure is not limited to this. The temperature change amount of the low-temperature heat medium circulating (that is, flowing) after the heat absorption adjusting device changes the heat absorption amount of the low-temperature heat medium in respective heat absorption devices, can be used for the same determination process as in the above-described embodiments.

For example, the amount of temperature change of the low-temperature heat medium, detected by the temperature sensor arranged at the inlet portion of the heat medium passage 16*b* of the chiller 16, may be adopted for the determination of the recovery condition.

(7) Further, in the above-described embodiments, the battery 31 or the inverter 36 is employed as a heat generator in the present disclosure, but the present disclosure is not limited to this. As the heat generator in the present disclosure, various devices can be employed as long as the devices are mounted on a vehicle and secondarily generate heat along with operation for exhibiting a predetermined function.

For example, a motor generator, a charger, constituent devices of an advanced driving assistance system, and the like can be employed as the heat generator. Then, the motor generator outputs driving force for traveling by being supplied with electric power, and generates regenerative electric power at the time of deceleration or the like.

The charger is, for example, a charger that charges the battery 31 with electric power. The constituent devices of the advanced driving assistance systems are constituent devices of a system developed for automating, adapting, and enhancing the vehicle system for safe and better driving, and can include a control unit and the like of this system.

In a case where various heat generators described above are adopted, it may be determined that the recovery condition is satisfied at step S4 or step S400 when a difference between the temperature of the low-temperature heat medium flowing into the chiller 16 and the temperature of the heat generator is equal to or less than a predetermined temperature difference. In this case, the heat generator corresponds to an example of the increased heat absorption device.

Although the present disclosure has been described in accordance with embodiments, it is understood that the present disclosure is not limited to such embodiments or structures. The present disclosure encompasses various modifications and variations within the scope of equivalents. In addition, as the various combinations and configurations, which are preferred, other combinations and configurations, including more, less or only a single element, are also within the spirit and scope of the present disclosure.

What is claimed is:

1. A refrigeration cycle device comprising:
   a heat pump cycle that includes a compressor configured to compress and discharge a refrigerant, a high-temperature heat medium-refrigerant heat exchanger configured to exchange heat between the refrigerant discharged from the compressor and a high-temperature heat medium, and a heat-absorbing decompression unit configured to decompress the refrigerant flowing out of the high-temperature heat medium-refrigerant heat exchanger, and a low-temperature heat medium-refrigerant heat exchanger configured to exchange heat between a low-pressure refrigerant decompressed by the heat-absorbing decompression unit and a low-temperature heat medium;
   a high-temperature heat medium circuit having a heating heat exchanger configured to heat a fluid to be temperature-adjusted by exchanging heat between the high-temperature heat medium flowing out of the high-temperature heat medium-refrigerant heat exchanger and the fluid;
   a low-temperature heat medium circuit including a plurality of heat absorption devices configured to have a heat absorption amount to be absorbed by the low-temperature heat medium flowing out of the low-temperature heat medium-refrigerant heat exchanger, and a heat absorption adjusting unit configured to change the heat absorption amount of the low-temperature heat medium in the respective heat absorption devices; and
   a controller configured to reduce a flow amount of the refrigerant flowing into the low-temperature heat medium-refrigerant heat exchanger when the heat absorption adjusting unit changes the heat absorption amount of the low-temperature heat medium in the respective heat absorption devices, wherein
   the controller is configured to determine that a predetermined recovery condition is satisfied when a difference between a temperature of an increased heat absorption device in which the amount of heat absorbed by the low-temperature heat medium is increased among the heat absorption devices, and the temperature of the low-temperature heat medium is equal to or less than a predetermined temperature difference, and
   the controller is configured to increase the flow amount of the refrigerant flowing into the low-temperature heat medium-refrigerant heat exchanger when the predetermined recovery condition is satisfied.

2. The refrigeration cycle device according to claim 1, wherein
   the increased heat absorption device is an exterior heat exchanger in which the low-temperature heat medium is heat exchanged with outside air, and
   the temperature of the increased heat absorption device is an outside air temperature.

3. The refrigeration cycle device according to claim 1, wherein
   the controller is configured to reduce the flow amount of the refrigerant flowing into the low-temperature heat medium-refrigerant heat exchanger when the heat absorption adjusting unit changes the heat absorption amount of the low-temperature heat medium in the respective heat absorption devices, and to increase the flow amount of the refrigerant flowing into the low-temperature heat medium-refrigerant heat exchanger by increasing a refrigerant discharge capacity of the compressor when the predetermined recovery condition is satisfied, and
   the controller is configured to control an increase ratio of a refrigerant discharge capacity of the compressor when the predetermined recovery condition is satisfied in a case where the heat absorption adjusting unit adjusts the heat absorption amount of the low-temperature heat medium in the heat absorption devices to increase the temperature of the low-temperature heat medium flowing into the low-temperature heat medium-refrigerant heat exchanger, to be smaller than an increase ratio of the refrigerant discharge capacity of the compressor when the predetermined recovery condition is satisfied in a case where the heat absorption adjusting unit adjusts the heat absorption amount of the low-temperature heat medium in the heat absorption devices to reduce the temperature of the low-temperature heat medium flowing into the low-temperature heat medium-refrigerant heat exchanger.

4. The refrigeration cycle device according to claim 1, wherein
the controller is configured to reduce the flow amount of the refrigerant flowing into the low-temperature heat medium-refrigerant heat exchanger when the heat absorption adjusting unit changes the heat absorption amount of the low-temperature heat medium in the respective heat absorption devices, and to increase the flow amount of the refrigerant flowing into the low-temperature heat medium-refrigerant heat exchanger by increasing a throttle opening degree of the heat-absorbing decompression unit when the predetermined recovery condition is satisfied, and
the controller is configured to control an increase ratio of the throttle opening degree of the heat-absorbing decompression unit when the predetermined recovery condition is satisfied in a case where the heat absorption adjusting unit adjusts the heat absorption amount of the low-temperature heat medium in the heat absorption devices to increase the temperature of the low-temperature heat medium flowing into the low-temperature heat medium-refrigerant heat exchanger, to be larger than an increase ratio of the throttle opening degree of the heat-absorbing decompression unit when the predetermined recovery condition is satisfied in a case where the heat absorption adjusting unit adjusts the heat absorption amount of the low-temperature heat medium in the heat absorption devices to reduce the temperature of the low-temperature heat medium flowing into the low-temperature heat medium-refrigerant heat exchanger.

5. The refrigeration cycle device according to claim 1, wherein
the plurality of heat absorption devices include at least a first heat absorption unit and a second heat absorption unit, and
a temperature zone of the first heat absorption unit and a temperature zone of the second heat absorption unit are different from each other.

6. The refrigeration cycle device according to claim 1, wherein
the heat pump cycle includes a cooling decompression unit configured to decompress the refrigerant flowing out of the high-temperature heat medium-refrigerant heat exchanger, and a cooling heat exchanger configured to cool the fluid to be temperature-adjusted by exchanging heat between a low-pressure refrigerant decompressed by the cooling decompression unit and the fluid to be temperature-adjusted, and
the controller is configured to reduce the flow amount of the refrigerant flowing into the low-temperature heat medium-refrigerant heat exchanger by reducing a flow ratio of the flow amount of the refrigerant flowing into the low-temperature heat medium-refrigerant heat exchanger to the flow amount of the refrigerant flowing into the cooling heat exchanger when the heat absorption adjusting unit changes the heat absorption amount of the low-temperature heat medium in the respective heat absorption devices.

7. The refrigeration cycle device according to claim 1, wherein
the controller is configured to reduce the flow amount of the refrigerant flowing into the low-temperature heat medium-refrigerant heat exchanger by reducing a refrigerant discharge capacity of the compressor when the heat absorption adjusting unit changes the heat absorption amount of the low-temperature heat medium in the respective heat absorption devices.

8. The refrigeration cycle device according to claim 1, wherein
the controller is configured to reduce the flow amount of the refrigerant flowing into the low-temperature heat medium-refrigerant heat exchanger by reducing a throttle opening degree of the heat-absorbing decompression unit when the heat absorption adjusting unit changes the heat absorption amount of the low-temperature heat medium in the respective heat absorption devices.

9. The refrigeration cycle device according to claim 1, wherein
the heat absorption adjusting unit includes a flow adjusting unit configured to adjust a flow amount of the low-temperature heat medium flowing into the plurality of heat absorption devices.

10. The refrigeration cycle device according to claim 1, wherein
the plurality of heat absorption devices include at least a heat generator that generate heat during operation, and
the heat absorption adjusting unit is configured to reduce a flow amount of the refrigerant flowing into the low-temperature heat medium-refrigerant heat exchanger when the heat absorption adjusting unit changes the heat absorption amount of the heat generator.

11. The refrigeration cycle device according to claim 1, wherein
the high-temperature heat medium circuit includes an auxiliary heater configured to heat the high-temperature heat medium, and
the auxiliary heater is configured to heat the high-temperature heat medium such that the temperature of the fluid flowing out of the heating heat exchanger approaches a target temperature.

12. A refrigeration cycle device comprising:
a heat pump cycle that includes a compressor configured to compress and discharge a refrigerant, a high-temperature heat medium-refrigerant heat exchanger configured to exchange heat between the refrigerant discharged from the compressor and a high-temperature heat medium, and a heat-absorbing decompression unit configured to decompress the refrigerant flowing out of the high-temperature heat medium-refrigerant heat exchanger, and a low-temperature heat medium-refrigerant heat exchanger configured to exchange heat between a low-pressure refrigerant decompressed by the heat-absorbing decompression unit and a low-temperature heat medium;
a high-temperature heat medium circuit having a heating heat exchanger configured to heat a fluid to be temperature-adjusted by exchanging heat between the high-temperature heat medium flowing out of the high-temperature heat medium-refrigerant heat exchanger and the fluid;

a low-temperature heat medium circuit including a plurality of heat absorption devices configured to have a heat absorption amount to be absorbed by the low-temperature heat medium flowing out of the low-temperature heat medium-refrigerant heat exchanger, and a heat absorption adjusting unit configured to change the heat absorption amount of the low-temperature heat medium in the respective heat absorption devices; and a controller configured to reduce the flow amount of the refrigerant flowing into the low-temperature heat medium-refrigerant heat exchanger when the heat absorption adjusting unit changes the heat absorption amount of the low-temperature heat medium in the respective heat absorption devices, and to increase the flow amount of the refrigerant flowing into the low-temperature heat medium-refrigerant heat exchanger by increasing a refrigerant discharge capacity of the compressor when a predetermined recovery condition is satisfied, and the controller is configured to control an increase ratio of a refrigerant discharge capacity of the compressor when the predetermined recovery condition is satisfied in a case where the heat absorption adjusting unit adjusts the heat absorption amount of the low-temperature heat medium in the heat absorption devices to increase the temperature of the low-temperature heat medium flowing into the low-temperature heat medium-refrigerant heat exchanger, to be smaller than an increase ratio of the refrigerant discharge capacity of the compressor when the recovery condition is satisfied in a case where the heat absorption adjusting unit adjusts the heat absorption amount of the low-temperature heat medium in the heat absorption devices to reduce the temperature of the low-temperature heat medium flowing into the low-temperature heat medium-refrigerant heat exchanger.

13. The refrigeration cycle device according to claim 12, wherein
the controller determines that the recovery condition is satisfied when a temperature change amount of the low-temperature heat medium becomes equal to or less than a predetermined change amount.

14. A refrigeration cycle device comprising:
a heat pump cycle that includes a compressor configured to compress and discharge a refrigerant, a high-temperature heat medium-refrigerant heat exchanger configured to exchange heat between the refrigerant discharged from the compressor and a high-temperature heat medium, and a heat-absorbing decompression unit configured to decompress the refrigerant flowing out of the high-temperature heat medium-refrigerant heat exchanger, and a low-temperature heat medium-refrigerant heat exchanger configured to exchange heat between a low-pressure refrigerant decompressed by the heat-absorbing decompression unit and a low-temperature heat medium;

a high-temperature heat medium circuit having a heating heat exchanger configured to heat a fluid to be temperature-adjusted by exchanging heat between the high-temperature heat medium flowing out of the high-temperature heat medium-refrigerant heat exchanger and the fluid;

a low-temperature heat medium circuit including a plurality of heat absorption devices configured to have a heat absorption amount to be absorbed by the low-temperature heat medium flowing out of the low-temperature heat medium-refrigerant heat exchanger, and a heat absorption adjusting unit configured to change the heat absorption amount of the low-temperature heat medium in the respective heat absorption devices; and a controller configured to reduce the flow amount of the refrigerant flowing into the low-temperature heat medium-refrigerant heat exchanger when the heat absorption adjusting unit changes the heat absorption amount of the low-temperature heat medium in the respective heat absorption devices, and to increase the flow amount of the refrigerant flowing into the low-temperature heat medium-refrigerant heat exchanger by increasing a throttle opening degree of the heat-absorbing decompression unit when a predetermined recovery condition is satisfied, and the controller is configured to control an increase ratio of the throttle opening degree of the heat-absorbing decompression unit when the recovery condition is satisfied in a case where the heat absorption adjusting unit adjusts the heat absorption amount of the low-temperature heat medium in the heat absorption devices to increase the temperature of the low-temperature heat medium flowing into the low-temperature heat medium-refrigerant heat exchanger, to be larger than an increase ratio of the throttle opening degree of the heat-absorbing decompression unit when the recovery condition is satisfied in a case where the heat absorption adjusting unit adjusts the heat absorption amount of the low-temperature heat medium in the heat absorption devices to reduce the temperature of the low-temperature heat medium flowing into the low-temperature heat medium-refrigerant heat exchanger.

15. The refrigeration cycle device according to claim 14, wherein
the controller determines that the recovery condition is satisfied when a temperature change amount of the low-temperature heat medium becomes equal to or less than a predetermined change amount.

* * * * *